United States Patent
Rogers et al.

(10) Patent No.: US 10,194,128 B2
(45) Date of Patent: Jan. 29, 2019

(54) SYSTEMS AND PROCESSES FOR GENERATING A DIGITAL CONTENT ITEM

(71) Applicant: Amazon Technologies, Inc., Seattle, WA (US)

(72) Inventors: Brian Rogers, Brooklyn, NY (US); Sohrab Andaz, Seattle, WA (US); Jason Kita Choi, New York, NY (US); Yun Sup Hong, Oakland Gardens, NY (US)

(73) Assignee: Amazon Technologies, Inc., Seattle, WA (US)

( * ) Notice: Subject to any disclaimer, the term of this patent is extended or adjusted under 35 U.S.C. 154(b) by 21 days.

(21) Appl. No.: 15/620,766

(22) Filed: Jun. 12, 2017

(65) Prior Publication Data

US 2018/0359456 A1 Dec. 13, 2018

(51) Int. Cl.
*G08B 6/00* (2006.01)
*H04N 9/87* (2006.01)
*G11B 27/34* (2006.01)
*G11B 27/036* (2006.01)

(52) U.S. Cl.
CPC .......... *H04N 9/8715* (2013.01); *G08B 6/00* (2013.01); *G11B 27/036* (2013.01); *G11B 27/34* (2013.01)

(58) Field of Classification Search
CPC ........ G08B 6/00; G11B 27/036; G11B 27/34; H04N 9/8715
See application file for complete search history.

(56) References Cited

U.S. PATENT DOCUMENTS

| 2015/0199024 | A1 | 7/2015 | Birnbaum et al. |
| 2015/0362993 | A1 | 12/2015 | Billington |
| 2016/0048373 | A1 | 2/2016 | Weil et al. |
| 2016/0342202 | A1* | 11/2016 | Kang ............... G06F 3/011 |
| 2017/0150013 | A1 | 5/2017 | Lacroix et al. |
| 2017/0243452 | A1* | 8/2017 | Levesque .......... G08B 6/00 |

FOREIGN PATENT DOCUMENTS

WO  WO2008108560  9/2008

OTHER PUBLICATIONS

PCT Search Report and Written Opinion dated Aug. 21, 2018, for related PCT Application No. PCT/US2018/36064, 13 pages.

* cited by examiner

*Primary Examiner* — Huy T Nguyen
(74) *Attorney, Agent, or Firm* — Lee & Hayes, PC

(57) ABSTRACT

An example method includes causing playback of a video, receiving a first input during playback of the video, and receiving a second input during playback of the video. In such methods, the second input is separate from the first input. The method also includes determining a length of time extending from the end of the first input to the beginning of the second input. The method further includes generating a digital content item including at least a video file corresponding to the video, and a sequential data list. The sequential data list includes a duration of the first input followed by a duration of the second input. The sequential data list also includes the length of time listed between the duration of the first input and the duration of the second input.

20 Claims, 12 Drawing Sheets

SYSTEMS AND PROCESSES FOR GENERATING A DIGITAL CONTENT ITEM

BACKGROUND

It has become common to embed haptic tracks within such digital content items. For example, such haptic tracks may be consumed by the electronic device of the potential customer when the customer views the video corresponding to the item. Such haptic tracks may cause a motor or other vibration device within the electronic device to activate and stay activated while the customer is viewing portions of the video on the electronic device. In such examples, the activation of the vibration device at various times during the playback of the video, or other such haptic events, may enhance the customer's enjoyment of the video and may increase the customer's interest in the corresponding item being offered for sale. However, known methods of generating haptic tracks require the merchant to provide alpha numeric entries setting forth the intensity, start time, and duration of every haptic event to be included in the haptic track. Generating haptic tracks in this way can be tedious and time consuming for merchants. Additionally, manually entering such detailed information commonly results in errors, thereby further complicating the haptic track creation process. Further, current methods of generating haptic tracks do not enable merchants to enter such haptic information while viewing the video. As a result, when the digital content item is consumed by the customer's electronic device, the activation of the vibration device, or other such haptic events, may not accurately coincide with corresponding events shown in the video.

BRIEF DESCRIPTION OF THE DRAWINGS

This detailed description makes reference to the accompanying figures. In the figures, the left-most digit(s) of a reference number identifies the figure in which the reference number first appears. The same reference numbers in different figures indicate similar or identical items.

As shown in FIG. 1, in some examples, the server computer may include a haptic module configured to assist in generating a haptic track that may be associated with a digital content item. In some examples, the customer devices may also include a haptic module configured to consume the haptic track and to control operation of one or more haptic devices during playback of the digital content item.

DETAILED DESCRIPTION

Figure 1:
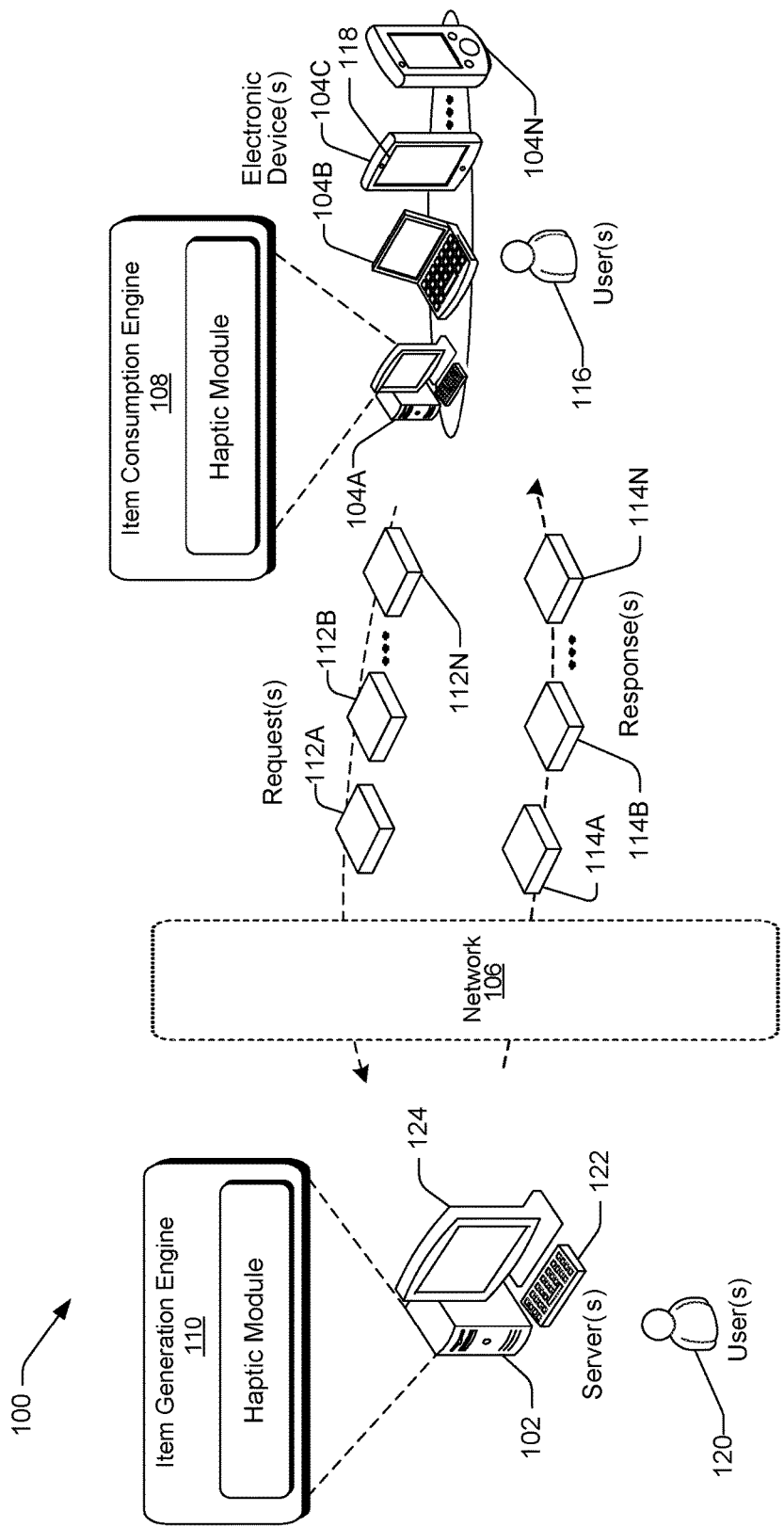
FIG. 1 is a schematic diagram of an example system of the present disclosure. In the embodiment shown in FIG. 1, the system includes a server computer, and the server computer may be coupled to one or more customer devices via a network.

Described herein are systems, apparatuses, and methods related to the generation of digital content items such as parent advertisements associated with items being offered for sale by various merchants. In particular, the systems, apparatuses, and methods described herein may relate to generating one or more haptic tracks, and generating a digital content item that includes a sequential data list or other component of a haptic track. The example systems of the present disclosure may include one or more computing devices such as a server computer. Such example systems may also include one or more electronic devices in communication with the server computer via a network. In this configuration, a user of the server computer may begin the process of generating a digital content item by selecting a video for use in the digital content item. Such a video may comprise, for example, a video file stored in a memory associated with the server computer, and in some examples, the video may illustrate one or more items that the user wishes to offer for sale. The user of the server computer may then select one of a plurality of methods of creating a haptic track to be associated with the video. For example, the user may provide an input, via a user interface, indicating selection of a creation method in which the user enters or indicates haptic events, during playback of the video, via a key on a keyboard or other input device associated with the server computer. In such a process, the server computer may provide a sequential countdown, such as via a display and/or via one or more speakers or other audio components associated with the server computer. When the countdown is completed, the server computer may begin playback of the selected video via the display.

As the user views the video via the display, the user may press a key on the keyboard (e.g., the spacebar) to add a haptic event to the haptic track. In particular, at a first point in time during the runtime of the video at which the user desires a haptic event to begin (when the video is played on an electronic device of a potential customer), the user may press the spacebar. The user may hold the spacebar down for a desired duration of the haptic event, and may release the spacebar at a second point in time during the runtime of the video at which the user desires the haptic event to end. This process may be repeated by the user multiple times as the user views the video via the display of the server computer. During this process, the server computer may sense, record, and/or otherwise determine the beginning and end of each respective input provide by the user (e.g., the first and second points in time and the duration of each spacebar press, key press, or other input). The server computer may also sense, record, and/or otherwise determine the length of time between each respective input provided by the user, and the server computer may use such information to generate one or more components of a haptic track associated with the video. For example, the server computer may generate a sequential data list that includes, in chronological order, the length of time during which no haptic feedback should be provided, and the duration of each desired haptic event. The server computer may also generate a digital content item that includes the sequential data list as well as the video file corresponding to the haptic track. Alternatively, the sequential data list may be saved in association with the video file such that the sequential data list may be played back simultaneously with the video file on an electronic device. In any of the examples described herein, during playback of the video on an electronic device of a potential customer, a processor of the electronic device consuming the digital content item may control one or more motors or other haptic devices of the electronic device in accordance with the information included in the sequential data list.

As a result of the features described herein, the process for generating a haptic track may be greatly simplified and may require significantly less time than known methods. In addition, because the processes described herein leverage the playback of a selected video during creation of the haptic track, such processes reduce the likelihood of errors associated with manual entry of haptic information. As a result, system and network efficiency may be increased, and overall user satisfaction may be improved.

Referring now to FIG. 1, a schematic diagram of an example system 100 for implementing various digital content item generation processes is illustrated. In the examples described herein, the system 100 may include any number of arrangements or components configured to assist in generating one or more digital advertisements, mixed content items, or other such digital content items. In some examples, such digital content items may include one or more digital images of an item being offered for sale by a merchant, text associated with such items, and/or controls configured to assist potential customers in purchasing the item. Additionally or alternatively, such digital content items may include one or more digital video files which, when executed, causes playback of a corresponding video via a display. Further, as will be described below, such digital content items may include one or more haptic tracks associated with the video file and configured to be executed, played, and/or otherwise consumed simultaneously with the video file. For example, the haptic track may comprise a sequential data list including a series of numbers, letters, or other characters. The sequential data list may be processed and/or otherwise consumed by a processor of an electronic device used by a potential customer. In such examples, playing and/or otherwise consuming the haptic track may cause the electronic device to activate, deactivate, and/or otherwise control operation of a vibration device included in the electronic device during playback of the video on the electronic device. It is understood that the haptic tracks, video files, sequential data lists, and/or other digital content described herein may be associated with digital advertisements, movies, electronic books, electronic magazines, digital music, and/or any other content that may be consumed on an electronic device.

As shown in FIG. 1, an example system 100 may include, among other things, one or more computers, computing devices, tablets, laptops, mobile phones, or other electronic devices. For example, such computers or computing devices may comprise one or more server computers 102 (collectively, "server(s) 102"). Such a system 100 may also include one or more additional computers, computing devices, tablets, laptops, mobile phones, or other electronic devices 104(1)-104(N) (collectively, "electronic device(s) 104") communicatively connected to the server(s) 102 by a network 106. The network 106 may be a local area network ("LAN"), a larger network such as a wide area network ("WAN"), or a collection of networks, such as the Internet. Protocols for network communication, such as TCP/IP, may be used to implement the network 106. Although embodiments are described herein as using a network 106 such as the Internet, other distribution techniques may be implemented that transmit information via memory cards, flash memory, or other portable memory devices.

An item consumption engine 108 on the electronic devices 104 and/or an item generation engine 110 on the servers 102 may receive one or more digital requests 112 (A)-112(N) (collectively, "requests 112," "digital queries 112," or "queries 112") and may generate one or more digital responses 114(A)-114(N) (collectively, "responses 114," or "digital responses 114") based on the queries 112. In example embodiments, the item consumption engine 108 of an electronic device 104 may generate one or more queries 112 via interaction of a customer and/or other user 116 with the electronic device 104. In such embodiments, the query 112 may comprise a request to view text or other information regarding an item being offered for sale by a merchant, a request to view a digital image of the item, a request to view a video associated with the item, and/or other requests associated with viewing and/or otherwise consuming an advertisement or other digital content item via the electronic device 104. The item consumption engine 108 may provide such queries 112 to the item generation engine 110 and/or other components of the server 102, via the network 106, and in response, the server 102 may generate at least a portion of the response 114. In such examples, the response 114 may include providing the electronic device 104 with access to one or more digital content items stored on and/or hosted by the server 102. Such access may enable the electronic device 104 to process and/or otherwise consume the digital content item. For example, consumption of the digital content item by a processor or other components of the electronic device 104 (e.g., the item consumption engine 108) may cause the electronic device 104 to play a video corresponding to the video file. Such consumption may also include consumption of the sequential data list described above, thereby causing a haptic module of the consumption engine 108 to activate, deactivate, and/or otherwise control operation of one or more vibration devices during playback of the video.

Each of the electronic devices 104 may include, among other things, a display component, a digital camera, and an audio input and transmission component. Such display components may comprise a touch screen, a liquid crystal display, and/or other such display 118 configured to display text, images, video, and/or other content associated with the various order processes described herein. Such displays 118 may also be configured to display a keyboard, buttons, slider bars, and/or other like controls configured to receive input from the user 116. Additionally or alternatively, the electronic devices 104 may include an external keyboard or other such input/output ("I/O") device configured to receive input from the user 116. Additionally, such audio input and transmission components may include one or more microphones. In such examples, the electronic devices 104 may receive inputs (e.g., audible instructions, voice commands, etc.) from the user 116 via a microphone, and the electronic devices 104 may be equipped with, for example, voice recognition software configured to process such inputs. Further, the digital cameras of the electronic devices 104 may be configured to track, record, and/or otherwise receive gesture inputs from the user 116. In some embodiments, a digital camera of the electronic device 104 may receive such gesture inputs without contact being made between the user 116 and, for example, the display or other components, controls, or surfaces of the electronic devices 104. In such examples, the electronic devices 104 may be equipped with, for example, gesture recognition software configured to process such inputs.

The electronic devices 104 may also include hardware and/or software that support voice over Internet Protocol (VoIP) as well as any of the display and/or I/O components described herein. Each of the electronic devices 104 may further include a web browser that enables the user 116 to navigate to a web page, such as a web page of one or more merchants or marketplaces, via the network 106. Each of the electronic devices 104 may also include and/or be configured to operate one or more web-based applications ("apps") with or without connectivity to the network 106. In some embodiments, the user 116 may generate one or more digital queries 112 using such a web page and/or such an app. For example, the user 116 may access and/or otherwise activate an app on the electronic device 104, and may utilize various functionality of the app, in concert with a keyboard displayed on the display 118 of the electronic device 104, the camera, the microphone, and/or a combination thereof, to generate one or more digital queries 112. The app may then facilitate a transfer of the query 112 to the server 102 via the network 106. Any of the queries 112 described herein may be generated by and/or provided to the item consumption engine 108 and/or other components of the electronic device 104, and the electronic device 104 may provide such queries 112 to the item generation engine 110 and/or other components of the server 102.

In various embodiments, the electronic devices 104 may include a mobile phone a portable computer, a tablet computer, an electronic book reader device (an "eBook reader device"), or other devices. Each of the electronic devices 104 may have software and hardware components that enable the input and display of digital queries 112, the consumption of various digital content items, the display of digital images, the playback of digital videos, the operation of one or more vibration devices to provide haptic feedback during playback of such digital videos, and/or the display of various digital responses 114 described herein. The electronic devices 104 noted above are merely examples, and other electronic devices that are equipped with network communication components, data processing components, electronic displays for displaying data, and components configured to receive multiple user inputs may also be employed.

The example system 100 may also include one or more merchants and/or other users 120, and such users 120 may utilize one or more of the server computers 102 to generate the haptic tracks, video files, text, digital images, and/or other components of the digital content items described herein. For example, a haptic module of the item generation engine 110 may be configured to assist in generating a sequential data list and/or other components of a haptic track, and such components may be included in one or more of the digital content items described herein. In further examples, any of the processes described herein, including generating a sequential data list and/or other components of a haptic track may be performed by one or more of the electronic devices 104. In such examples, the server computer 102 may send a link or other connection to such an electronic device 104, and such a link may enable the electronic device 104 to access content stored on the server computer, via the network 106, for the purpose of generating a sequential data list and/or other components of a haptic track. As noted above, one or more of the responses 114 may include such digital content items or components thereof. In some examples, the server computers 102 of the users 120 described herein may be disposed at a location remote from the electronic devices 104 of the users 116. In the examples described herein, the server computers 102 may include any of the components described herein with respect to the electronic devices 104. For example, the server computers 102 may include an external keyboard 122 or other such I/O device configured to receive input from the user 120. An example server computer 102 may also include, among other things, a display component, a digital camera, and/or an audio input and transmission component. Such display components may comprise a touch screen, a liquid crystal display, and/or other such display 124 configured to display text, images, video, and/or other content associated with the various order processes described herein. Such displays 124 may also be configured to display a keyboard, buttons, slider bars, and/or other like controls configured to receive input from the user 120. Various example components and functionality of the servers 102 and the electronic devices 104 will be described in greater detail below.

Figure 2:
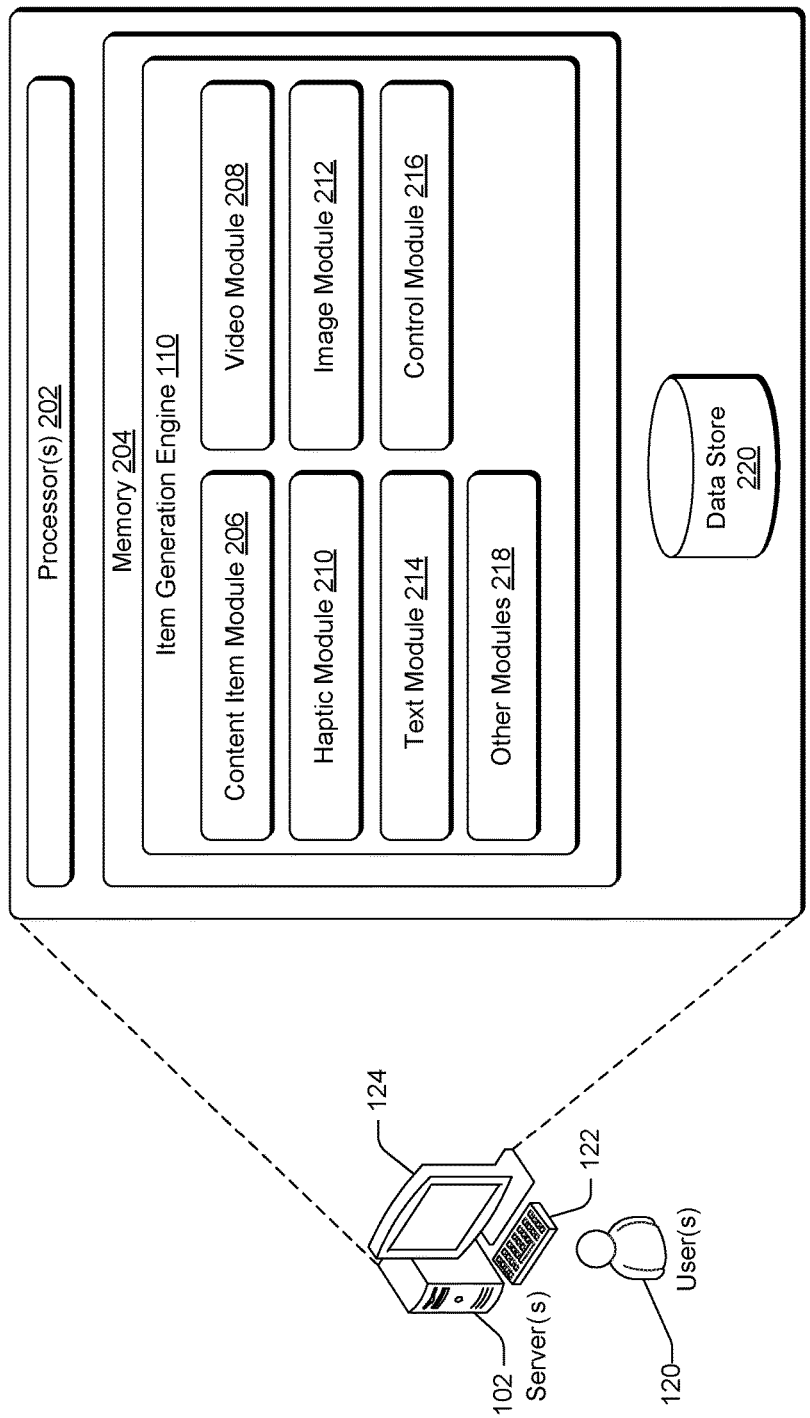
FIG. 2 is a schematic illustration of an item generation engine and other example components that may be included in a server computer associated with the system shown in FIG. 1.

FIG. 2 is a schematic diagram illustrating components of an example server 102 of the present disclosure. The server(s) 102 may comprise server computers, rack systems, and/or other computing devices, and such servers 102 may include one or more processor(s) 202 and memory 204. The memory 204 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms.

The item generation engine 110 may be a hardware or a software component of the server(s) 102 and in some embodiments, the item generation engine 110 may comprise a component of the memory 204. As shown in FIG. 2, in some embodiments the item generation engine 110 may include one or more of a content item module 206, a video module 208, a haptic module 210, an image module 212, a text module 214, a control module 216, and/or one or more additional/other modules 218. The modules of the item generation engine 110 may include routines, programs, instructions, objects, and/or data structures that perform particular tasks or implement particular abstract data types. For example, one or more of the modules described herein, and/or other components/portions of the memory 204 may include instructions which, when executed by the processor 202 and/or other components of the server 102, cause the server 102 to perform one or more operations. The server(s) 102 may also implement a data store 220 that stores data, digital queries 112, rule sets, digital content items, video files (e.g., Windows media video files, MP4 files, etc.), sequential data lists, digital images, text files and/or other text segments, hypertext transfer protocol links, java script logic, application program interfaces, and/or other information or content used by the item generation engine 110.

In example embodiments, the content item module 206 may be configured to receive information, data, and/or content from, and/or otherwise communicate with and/or transfer such content to each of the other modules included within the item generation engine 110. The content item module 206 may also be configured to receive one or more request 112 from an electronic device 104, and may be configured to generate and/or otherwise provide a response 114 to the electronic device 104. Additionally, the content item module 206 may be configured to receive various inputs from a user 120, and may be configured to execute a video file, cause playback of a video, determine respective lengths of time associated with the video and/or with inputs received from the user 120, determine respective durations of the inputs received from the user 120, generate sequential data lists and/or other components of a haptic track, generate a digital content item, and/or perform other operations at least partly in response to inputs received from the user 120. For example, the content item module 206 may provide an application program interface that may be used by the user 120 to generate an advertisement and/or other digital content item associated with an item being offered for sale. In such examples, the content item module 206 may provide one or more user interfaces via the display 124 to assist the user 120 in generating a haptic track or other components of the digital content item. As will be described with respect to at least FIGS. 5-10, such user interfaces may request selection of an operating mode governing the manner in which various inputs may be provided to the item generation engine 110 during creation of a digital content item. Such user interfaces may also display instructions associated with providing such inputs to the item generation engine 110, and may display a sequential (e.g., numeric) countdown or other visual indicator of time to assist the user 120 in generating a haptic track. Such countdowns may, for example, comprise a descending clock or other counter. In such examples, when a desired time period expires (e.g., 5 seconds, 3 seconds, etc.), playback of a video via the display 124 may begin. In still further examples, such user interfaces may provide one or more controls configured to enable the user 120 to adjust various parameters of the digital content item generation process. For example, such controls may enable the user 120 to modify (e.g., increase or decrease) a rate at which the video is played via the display 124, to modify an intensity level of the haptic feedback provided by the vibration device of the electronic device 104 when the digital content item is consumed by the electronic device 104, and/or to display a preview of at least part of the video via the display 124. During such a preview, the user interface may provide one or more controls configured to enable the user 120 to modify a duration of the haptic feedback provided by the vibration device during playback of the video on the electronic device 104, and/or to modify a length of time during which the vibration device is controlled to remain deactivated. In any of the examples described herein, it is understood that such controls (associated with the server computers 102 and/or the electronic devices 104) may additionally or alternatively comprise one or more buttons, keys, touchpads, or other components of a physical or virtual keyboard 122, mouse, stylus, or other such I/O device. Further, in any of the examples described herein, such a preview may be displayed via the same device (e.g., the server computer 102 or the electronic device 104) on which the sequential data list or other component of the haptic track was generated.

The video module 208 may be configured to assist in incorporating a digital video file (e.g., a Windows media video file, an MP4, etc.) and/or a hypertext transfer protocol link associated with a digital video file into the digital content item. For example, one or more digital video files may be stored in the data store 220. In such examples, a user interface provided by the content item module 206 may enable the user 120 to select one or more such video files for inclusion into an advertisement or other digital content item being generated. In response to an input provided by the user 120 via such a user interface (e.g., an input indicating selection of a particular video file), the video module 208 may obtain the selected video file and/or a hypertext transfer protocol link associated with the selected video file from the data store 220, and may provide the file and/or the link to the content item module 206 for inclusion in the digital content item being generated. In some examples, the video module 208 may also include a video player, a media player, a web viewer, java script logic, and/or other components configured to execute the digital video file at least partly in response to an input from the user 120. For example, the video module 208 may be configured to execute a digital video file at least partly in response to an input received via the keyboard 122, a mouse, the display 124, and/or other input device of the server 102. In such examples, executing the video file may cause the item generation engine 110 to playback a video corresponding to and/or otherwise contained within the video file via the display 124.

The haptic module 210 may be configured to receive and/or process one or more inputs received via the keyboard 122, a mouse, the display 124, and/or other input device of the server 102 and indicative of a desired haptic event. As noted above, such a haptic event may include activation of one or more motors or other vibration devices of the electronic device 104 during playback of a video on the electronic device 104. Such a haptic event may also include maintaining activation of the vibration device for a particular duration (e.g., a particular length of time). In such examples, the particular duration may be equal to a duration of the input received by the input device of the server 102. For example, during playback of a video on the display 124, a user 120 may press the spacebar or any other key on the keyboard 122 at a point in time during the runtime of the video at which the user 120 would like the haptic event (e.g., activation of the vibration device of the electronic device 104) to begin. The user 120 may hold the spacebar down for a desired period of time, and may then release the spacebar. In such examples, the input provided by the user 120 may have a beginning characterized by the pressing of the spacebar, an end characterized by the release of the spacebar, and a duration (e.g., a particular length of time) extending from the beginning of the input to the end of the input. It is understood that the beginning of the input and the end of the input may each correspond to respective points in time during the runtime of the video. In such examples, the haptic module 210 may receive, detect, track, record, and/or otherwise process the inputs received by the server computer 102 during playback of the video via the display 124. Such inputs may comprise touch inputs received via the keyboard 122 (e.g., via the spacebar as described above or via any other key, touchpad, or touch input component of the keyboard), the display 124, a mouse, and/or other input devices of the server 102. The haptic module 210 may also determine the beginning, the end, and the duration of each respective input.

Further, the haptic module 210 may determine a length of time extending from the beginning of the video to a point in time during the runtime of the video corresponding to the beginning of an input (e.g., an initial touch input) received via the keyboard 122, the display 124, a mouse, and/or other input devices of the server 102. Further, the haptic module 210 may determine a respective length of time extending from the end of a first touch input received via such input devices during playback of the video, to the beginning of a second (e.g., a subsequent) touch input received via the input devices during playback of the video. The haptic module 210 may store any of the determined beginnings, ends, durations, lengths of time, points in time during the runtime of the video, and/or other such events in the data store 220 for inclusion a the digital content item generated by the item content engine 110. In any of the examples described herein, the haptic module 210 may form a sequential list of numbers, letters, and/or other characters representing the determined beginnings, ends, durations, lengths of time, points in time, and/or other such events. Such a list may comprise a sequential data list, and the sequential data list may be stored in the data store 220 and included in the digital content item corresponding to the video file with which the sequential data list is associated.

The image module 212 may be configured to assist in incorporating a digital image file (e.g., a gif file, a jpg file, etc.) and/or a hypertext transfer protocol link associated with a digital image file into the digital content item. For example, one or more digital image files may be stored in the data store 220. In such examples, a user interface provided by the content item module 206 may enable the user 120 to select one or more such digital image files for inclusion into an advertisement or other digital content item being generated. In response to an input provided by the user 120 via such a user interface (e.g., an input indicating selection of a particular digital image file), the image module 212 may obtain the selected file and/or a hypertext transfer protocol link associated with the selected file from the data store 220, and may provide the file and/or the link to the content item module 206 for inclusion in the digital content item being generated. In some examples, the image module 212 may also include an image viewer, a media player, a web viewer, java script logic, and/or other components configured to execute the digital image file at least partly in response to an input from the user 120. For example, the image module 212 may be configured to execute a digital image file at least partly in response to an input received via the keyboard 122, a mouse, the display 124, and/or other input device of the server 102. In such examples, executing the digital image file may cause the item generation engine 110 to display an image corresponding to and/or otherwise contained within the digital image file via the display 124.

The text module 214 may be configured to assist in incorporating a digital text file, script, date object, and/or a hypertext transfer protocol link associated with a digital text file into the digital content item. For example, one or more digital text files may be stored in the data store 220. In such examples, a user interface provided by the content item module 206 may enable the user 120 to select one or more such digital text files for inclusion into an advertisement or other digital content item being generated. In response to an input provided by the user 120 via such a user interface (e.g., an input indicating selection of a particular digital text file), the text module 214 may obtain the selected file and/or a hypertext transfer protocol link associated with the selected file from the data store 220, and may provide the file and/or the link to the content item module 206 for inclusion in the digital content item being generated. In some examples, the text file may include text describing and/or otherwise associated with an object or other item being offered for sale. Such object may be shown in the digital images, digital videos, and/or other content included in the digital content item, and may assist a potential customer or other user 116 to understand and consider various features and/or functions of the object.

The control module 216 may be configured to generate and/or provide any of the controls or other functionality described herein with respect to the various user interfaces provided via the display 124. Such controls may be used, for example, during the generation of one or more digital content items by the user 120 of the server computer 102. In example embodiments, the control module 216 may include one or more application program interfaces, java script logic sets, and/or other components configured assist in providing functionality to a user 120 via a user interface. As noted above, example controls and/or other functionality provided by the control module 216 and included in various user interfaces of the present disclosure may include a clickable button, a data entry field, and/or other physical or virtual control enabling the user 120 to select an operating mode governing the manner in which various inputs may be provided to the item generation engine 110 during creation of a digital content item. Such controls may also include a clickable button, a data entry field, and/or other physical or virtual control enabling the user 120 to adjust various parameters of the digital content item generation process. For example, such controls may enable the user 120 to modify (e.g., increase or decrease) a rate at which a video is played via the display 124, to modify an intensity level of haptic feedback provided by the vibration device of the electronic device 104 when the digital content item is consumed by the electronic device 104, and/or to display a preview of at least part of the video via the display 124. During such a preview, the user interface may provide one or more controls configured to enable the user 120 to modify a duration of the haptic feedback provided by the vibration device during playback of the video on the electronic device 104, and/or to modify a length of time during which the vibration device is controlled to remain deactivated. As noted above, such controls (associated with the server computers 102 and/or the electronic devices 104) may additionally or alternatively comprise one or more buttons, keys, touchpads, or other components of a physical or virtual keyboard 122, mouse, stylus, or other such I/O device.

The data store 220 may store any of the requests 112, responses 114, inputs, video files, image files, text files, durations, lengths of time, sequential data lists, data objects, digital content items, and/or other digital items/content described herein. For example, the data store 220 may store any items that are generated by the modules of the item generation engine 110, received from the electronic devices 104, and/or otherwise generated or received by the server computers 102. Such items may be, for example, provided to the data store 220 as part of any of the methods described herein.

In example embodiments, one or more modules of the item generation engine 110 described above may be combined or omitted. Additionally, one or more modules of the item generation engine 110 may also be included in the item consumption engine 108 of the electronic device 104. As a result, the example methods and techniques of the present disclosure may be performed solely on either the server 102, or on one or more of the electronic devices 104. Alternatively, in further embodiments, methods and techniques of the present disclosure may be performed, at least in part, on both the server 102 and on one or more of the electronic devices 104.

Figure 3:
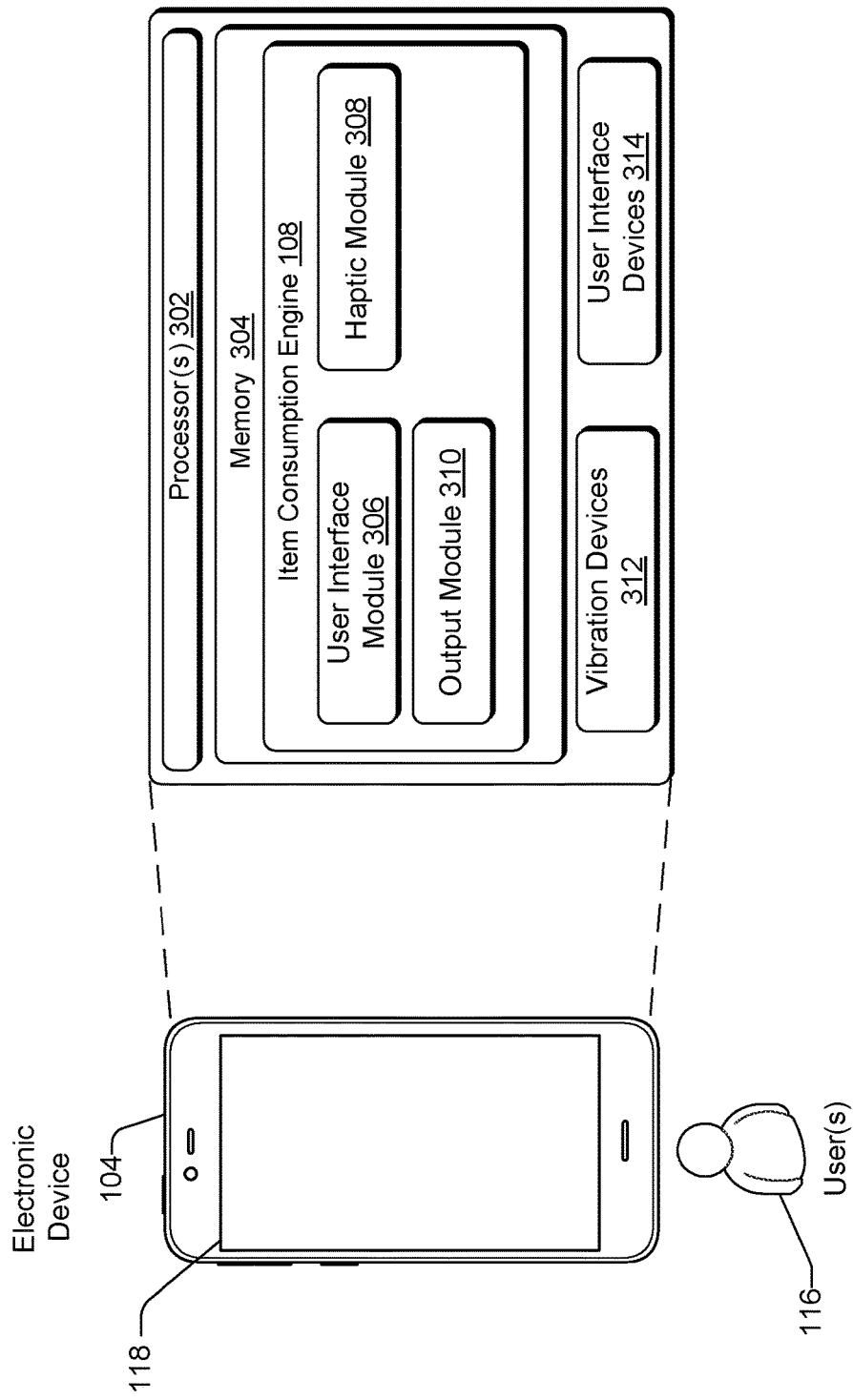
FIG. 3 is a schematic illustration of an item consumption engine and other example components that may be included in an electronic device associated with the system shown in FIG. 1.

FIG. 3 is a schematic diagram illustrating various components in an example electronic device 104. As noted above, such an electronic device 104 may be used to generate and transmit one or more digital queries 112, and to receive and consume one or more corresponding digital responses 114. In some examples, such responses 114 may include and/or otherwise provide the electronic device 104 with access to a digital content item via the network 106. The electronic device 104 shown in FIG. 3 may include one or more of the components described above with respect to the server 102 such that digital queries 112 and/or digital responses 114 may be created and/or consumed solely on the electronic device 104. In example embodiments, the electronic device 104 may include one or more processor(s) 302 and memory 304. The memory 304 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as a carrier wave, or other transmission mechanisms.

The memory 304 of the electronic device 104 may include an item consumption engine 108, and the item consumption engine 108 may include any of the modules or other components described above with respect to the item generation engine 110 of the server 102. Additionally or alternatively, the item consumption engine 108 of the electronic device 104 may include one or more of a user interface module 306, a haptic module 308, and an output module 310. Although not illustrated in FIG. 3, it is understood that the memory 304 of the electronic device 104 may also include a data store similar to the data store 220 described above with respect to the server computer 102. The modules of the item consumption engine 108 may include routines, programs, instructions, objects, and/or data structures that perform particular tasks or implement particular abstract data types. For example, one or more of the modules described herein with respect to the item consumption engine 108 and/or other components/portions of the memory 304 may include instructions which, when executed by the processor 302 and/or other components of the electronic device 104, cause the electronic device 104 to perform one or more operations. The electronic device 104 may also include one or more motors, servo devices, electromagnetic actuators, and/or other vibration devices 312, as well as one or more cameras, microphones, displays 118 (e.g., a touch screen display), keyboards, mice, touch pads, proximity sensors, capacitance sensors, or other user interface devices 314.

The user interface module 306 may enable the user 116 to access one or more websites, online marketplaces, search engines, and/or query generation/processing applications on the electronic device 104. The user interface module 306 may provide a user interface and corresponding functionality associated with such applications via the display 118 of the electronic device 104. The user interface module 306 may also be in communication with one or more additional modules of the item consumption engine 108 to assist in various request functions. For example, the user interface module 306 may be configured to receive one or more inputs from the user 116, such as via a touch screen display of the electronic device 104, and may be configured to provide such inputs to the output module 310 so that such inputs may be used to generate one or more queries 112, inputs, requests, order confirmations, and/or other messages, signals, or electronic transmissions. The user interface module 306 may also present, display, and/or otherwise provide one or more responses 114 received from the server 102 on the display 118 of the electronic device 104. For example, the user interface module 306 and/or other components of the item consumption engine 108 may consume a digital content item that has been accessed via the network 106. In such examples, consumption of the digital content item may cause the user interface module 306 to play a video corresponding to a video file included in the digital content item. Additionally, consumption of the digital content item may cause the haptic module 308 to control and/or modify operation of the vibration device 312 during playback of the video. For example, consumption and/or other processing of the sequential data list included in the digital content item may cause the haptic module 308 to maintain the vibration device 312 deactivated, at the beginning of the video, for a first length of time. Consumption and/or other processing of the sequential data list included in the digital content item may also cause the haptic module 308 to activate the vibration device 312, at a point in time during the runtime of the video corresponding to the beginning of an input by the user 120. Further, consumption and/or other processing of the sequential data list included in the digital content item may also cause the haptic module 308 to maintain activation of the vibration device 312 for a length of time equal to the duration of the user's input, or until playback of the video on the electronic device 104 is paused and/or stopped altogether. In any of the examples described herein, the haptic module 308 may be similar to and/or the same as the haptic module 210 described above, and may be configured to perform any of the functions of the haptic module 210. For example, any of the processes described herein, including generating a sequential data list and/or other components of a haptic track may be performed by the haptic module 308 of the electronic device 104.

The output module 310 may enable the user 116 to generate one or more queries 112 based at least in part on inputs received from the user 116. For example, the user interface module 306 may provide one or more user interfaces via the display 118 of the electronic device 104, and such user interfaces may include one or more buttons, controls, keyboards, and/or other fields/components configured to receive inputs (e.g., touch inputs). Such inputs may be used by the output module 310 to generate a corresponding query 112. Some examples, such inputs may include a natural language question and/or other statement indicative of information being sought by the user 116 with respect to, for example, an object or item being offered for sale by the user 120. In such examples, the query 112 generated by the output module 310 may comprise the text of the question and/or other statement provided by the user 116. The output module 310 may be configured to provide one or more such queries 112 to the server 102 via the network 106. For example, the output module 310 of the electronic device 104 may comprise one or more kernels, drivers, or other like components configured to provide communication between the servers 102 and one or more of the electronic devices 104.

Figure 4A:
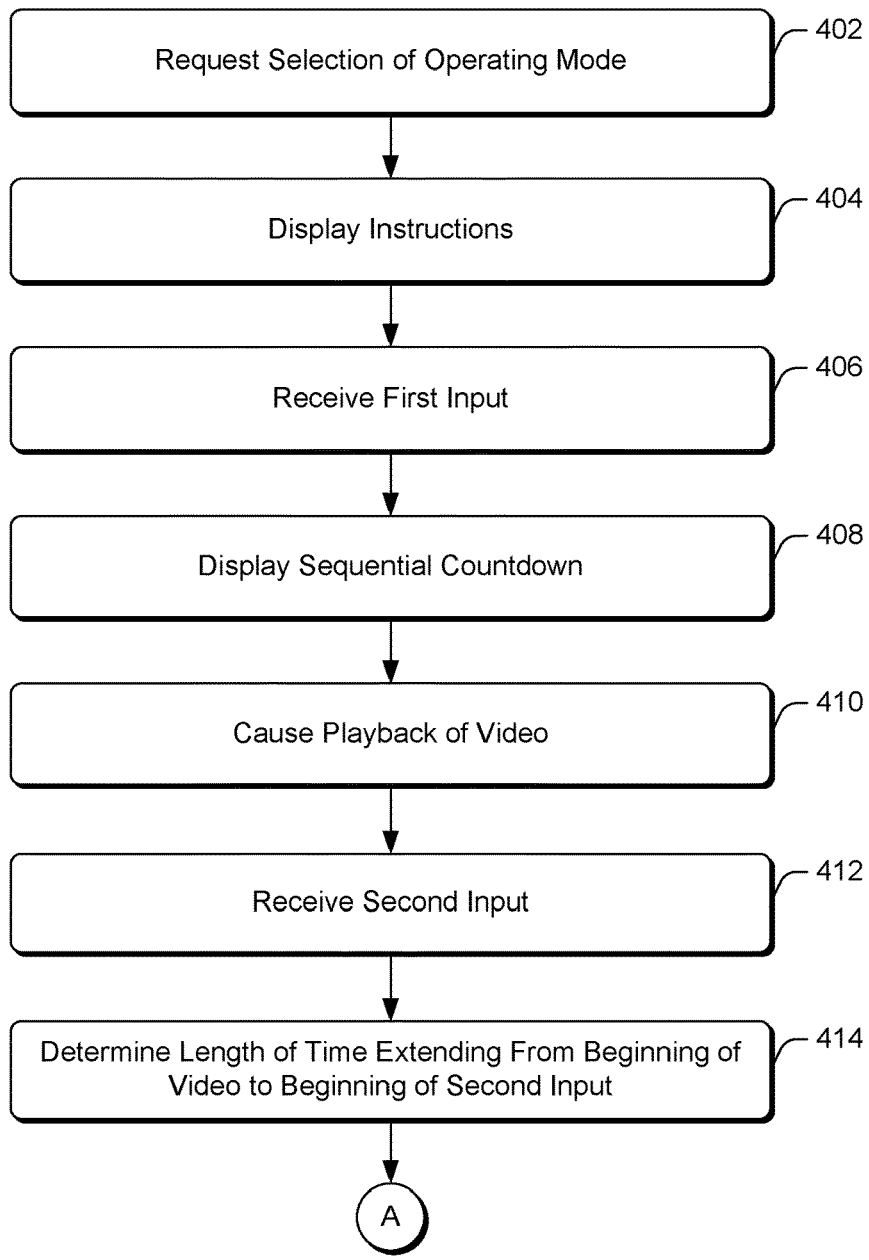
FIGS. 4A and 4B show a flow chart illustrating an example method of generating a digital content item.

One or more of the devices and/or systems described herein may be configured to perform various operations associated with generating a haptic track, generating a sequential data list, generating a digital content item, providing access to the digital content item via the network 106, consuming the digital content item, and/or other function associated with providing information related to various objects or items via the internet. The flowcharts shown in FIGS. 4 and 4A illustrate an example method 400 of the present disclosure associated with generating a digital content item and providing access to the digital content item via the network 106. In addition, as will be noted below, FIGS. 5-11 provide further detail related to various aspects of the method 400.

The example method 400 is illustrated as a collection of steps in a logical flow diagram, which represents a sequence of operations that can be implemented in hardware, software, or a combination thereof. In the context of software, the steps represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 400 is described with reference to the system 100 of FIG. 1, and the corresponding devices illustrated in FIGS. 2 and 3.

Figure 5:
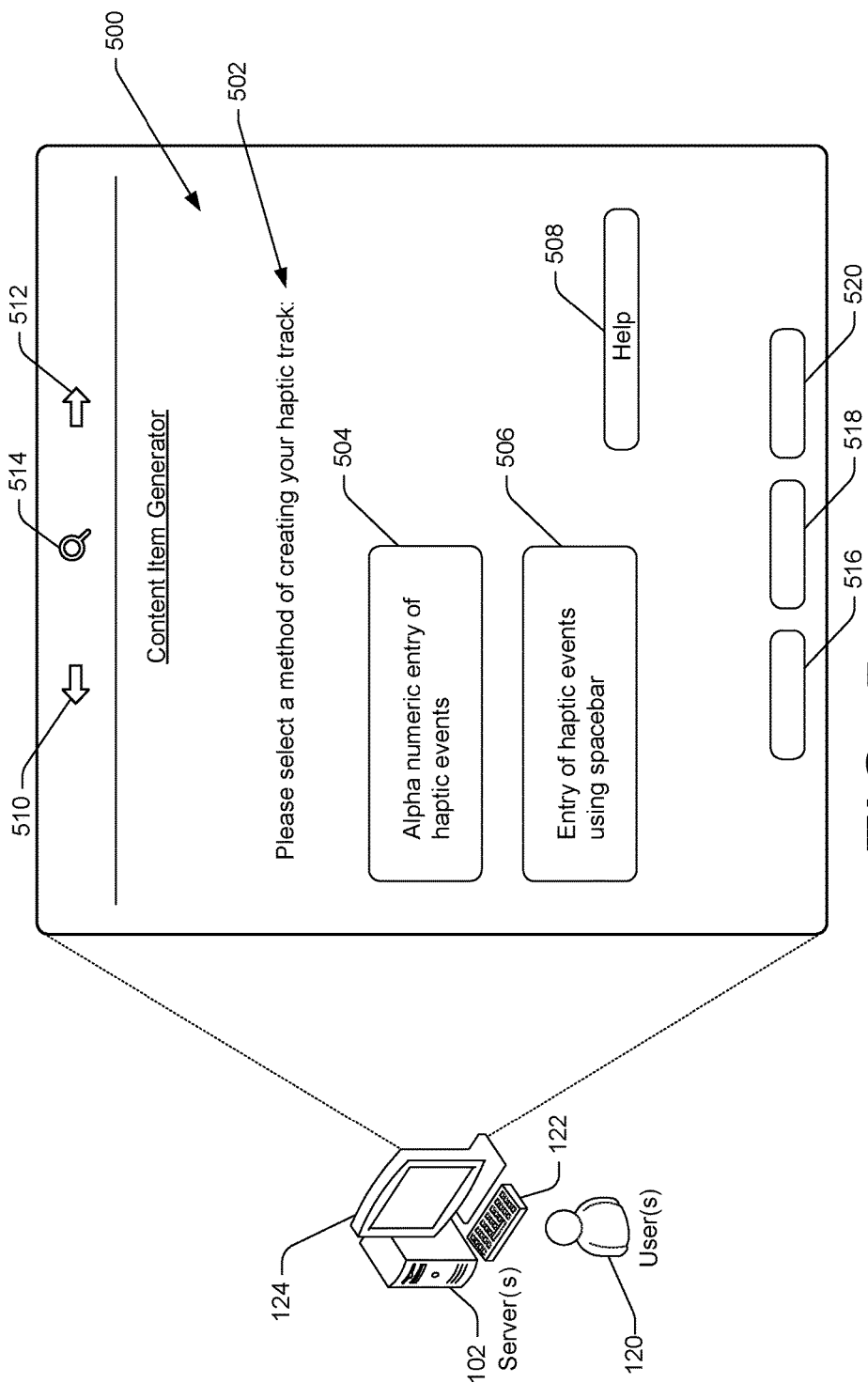
FIG. 5 illustrates an example user interface displayed on a display associated with the server computer of FIG. 1. The user interface shown in FIG. 5 enables a user to select an operating mode governing a manner in which inputs may be provided.

With reference to FIG. 4A, at block 402 the item generation engine 110 of the server computer 102 may request, via the display 124, selection of an operating mode governing the manner in which one or more inputs may be provided to the item generation engine 110. For example, at block 402 the content item module 206 may generate and/or provide one or more user interfaces to the user 120 via the display 124, and such user interfaces may be configured to receive input from the user 120 indicating selection of the desired operating mode, and/or may be configured to prompt the user 120 to select a desired operating mode using the keyboard 122 or other input device. Such an example user interface 500 is shown in FIG. 5. As illustrated in FIG. 5, an example user interface 500 may include text 502, a message, and/or instructions requesting that the user 120 select an operating mode from among a list or plurality of operating mode options. The user interface 500 may also include one or more clickable buttons, data entry fields, and/or other physical or virtual controls 504, 506 enabling the user 120 to select an operating mode governing the manner in which various inputs may be provided to the item generation engine 110 during creation of the digital content item. In some examples, such operating modes may include the alpha numeric entry of the intensity, start time, and/or duration of each respective haptic event. Such operating modes may also include the entry of each respective haptic event using the spacebar of the keyboard 122, one or more additional components of the keyboard 122, a mouse connected to the server 102, a touch pad, a touch screen display, and/or other input devices. Such controls may also include a help control 508 configured to enable the user 120 to request assistance from an automated assistance program or service, one or more navigation controls 510, 510 configured to assist the user 120 in proceeding forward or backward, respectively, through a content item generation process, and/or a search control 514 configured to assist the user 120 in searching for additional information via the network 106 (e.g., via one or more search engines accessing the internet). In additional examples, the user interface 500 may also include one or more additional controls 516, 518, 520 configured to provide additional functionality. It is understood that any of the controls described herein with respect to the user interfaces shown in FIGS. 5-10 may be provided by the control module 216 as noted above.

Figure 6:
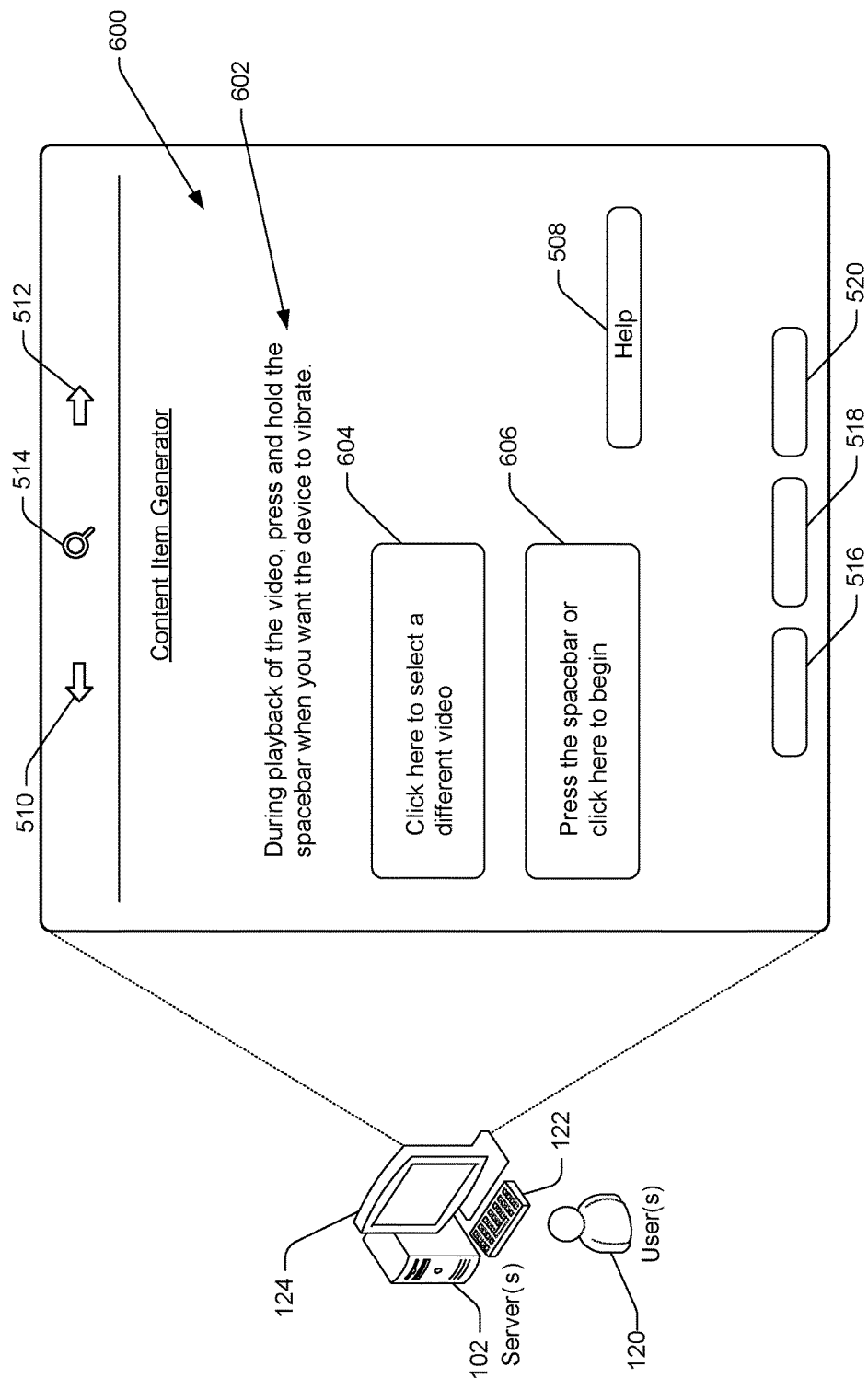
FIG. 6 illustrates another example user interface associated with the server computer of FIG. 1. The user interface shown in FIG. 6 provides a user with instructions for providing one or more inputs.

At block 404, the content item module 206 and/or other components of the item generation engine 110 may display, via the display 124, instructions associated with providing one or more inputs during the digital content item generation process. For example, at block 404 the content item module 206 may generate and/or provide one or more user interfaces to the user 120 via the display 124, and such user interfaces may be configured to receive input from the user 120, and/or may be configured to direct the user 120 to press one or more keys of the keyboard 122, a mouse, a touch screen, and/or other input device to indicate when a desired haptic event should occur and for how long the haptic event should occur. Such an example user interface 600 is shown in FIG. 6. As illustrated in FIG. 6, an example user interface 600 may include text 602, a message, and/or instructions directing the user 120 to press the spacebar or any other key on the keyboard 122, during playback of a selected video, at a point in time during the runtime of the video at which the user 120 would like a haptic event (e.g., activation of the vibration device of the electronic device 104) to begin. Such text 602 may also direct the user 120 to hold the spacebar down for a desired period of time equal to a desired duration of the haptic event, and/or to release the spacebar at a point in time during the runtime of the video at which the user 120 would like the haptic event to end. In such examples, the corresponding input provided by the user 120 may have a beginning characterized by the pressing of the spacebar, an end characterized by the release of the spacebar, and a duration extending from the beginning of the input to the end of the input. As noted above, such inputs may comprise touch inputs received via the keyboard 122 (e.g., via the spacebar as described above or via any other key, touchpad, or touch input component of the keyboard), the display 124, a mouse, and/or other input devices of the server 102. Further, as shown in FIG. 6 the user interface 600 may also include a control 604 enabling the user 120 to select a different video for inclusion in the digital content item, a control 606 enabling the user 120 to begin the digital content item generation process, and/or one or more additional controls, such as the controls described above.

Figure 7:
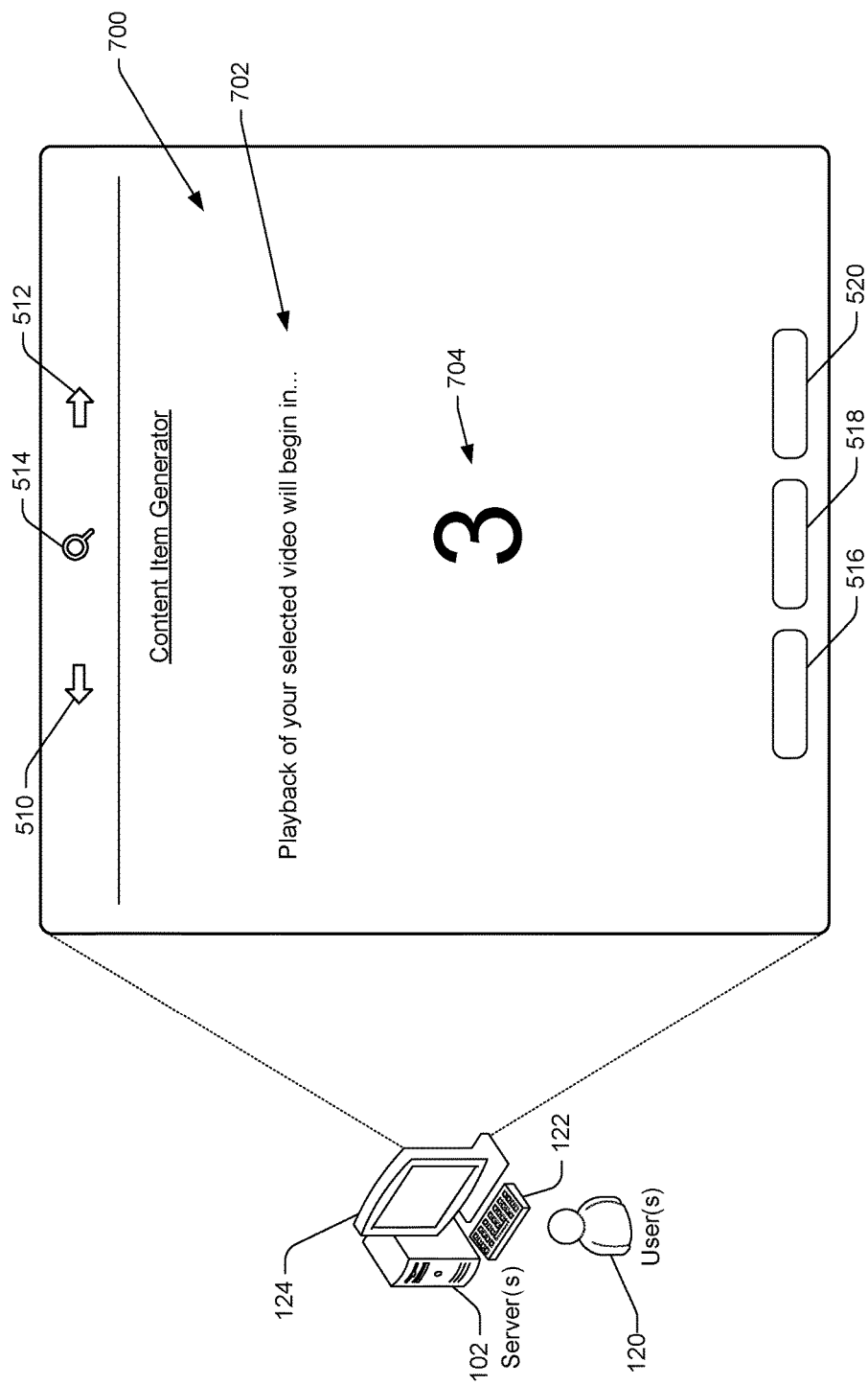
FIG. 7 illustrates a further example user interface associated with the server computer of FIG. 1. The user interface shown in FIG. 7 provides a user with a sequential countdown before playback of a video begins.

At block 406, the content item module 206 and/or other components of the item generation engine 110 may receive an input via the keyboard 122 or other input device of the server 102, and such an input may comprise an instruction from the user 120 to begin a digital content item generation process. For example, such an input may comprise a mouse click on or other like selection of the control 606 illustrated in FIG. 6. In some examples, at least partly in response to receiving such an input at block 406, the content item module 206 and/or other components of the item generation engine 110 may, at block 408, display a sequential countdown via the display 124. For example, at block 408 the content item module 206 may generate and/or provide one or more user interfaces to the user 120 via the display 124, and such user interfaces may be configured to display a real-time or substantially real-time numerical countdown before playback of a video selected by the user begins. Such an example user interface 700 is shown in FIG. 7. As illustrated in FIG. 7, an example user interface 700 may include text 702, a message, and/or instructions indicating that playback of the video, via the display 124, may begin after the countdown has ended. The user interface 700 may also include a sequential (e.g., numeric) countdown or other visual indicator 704 of time to assist the user 120 in preparing to generate a haptic track. Such visual indicators 704 may comprise, for example, a descending clock, a descending series of numerals, or other such counter configured to indicate the passing and/or expiration of a desired time period or wait period (e.g., 5 seconds, 3 seconds, etc.).

Figure 8:
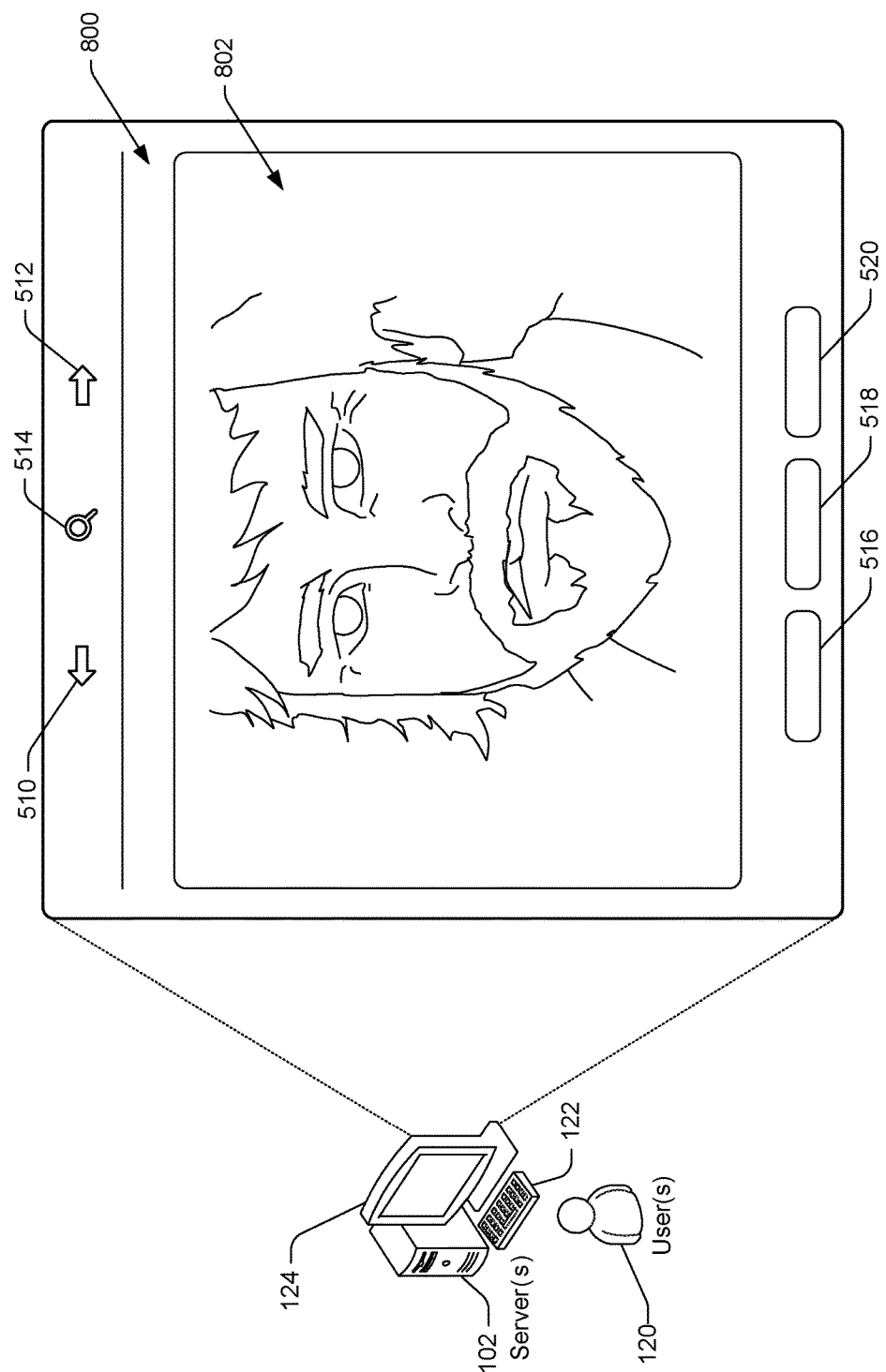
FIG. 8 illustrates another example user interface associated with the server computer of FIG. 1. The user interface shown in FIG. 8 provides playback of a video.

At block 410, the content item module 206 and/or other components of the item generation engine 110 may cause playback of a selected video, via the display 124, at least partly in response to the input received at block 406. The video played at block 410 may be selected by the user 120 at block 410, block 406, block 402, or at one or more other blocks of the method 400. For example, at block 410 the content item module 206 and/or the video module 208 may generate and/or provide one or more user interfaces to the user 120 via the display 124, and such user interfaces may be configured to play a digital video. Such a user interface may also be configured to receive input from the user 120 during playback of the video, and such input may indicate particular points in time during the runtime of the video at which haptic events should occur when the video is played via an electronic device 104 (e.g., such as during consumption of the digital content item by the processor 302 of the electronic device 104). Additionally or alternatively, as noted above, the user 120 may provide such inputs by pressing one or more keys of the keyboard 122, a mouse, a touch screen, and/or other input device. Such an example user interface 800 is shown in FIG. 8. As illustrated in FIG. 8, an example user interface 800 may include a window or other portion 802 in which the selected video may be presented to the user 120. Further, in such examples one or more of the controls 516, 518, 520 may be operable to accept input from the user 120 indicative of particular points in time during the runtime of the video at which haptic events should occur when the video is played via an electronic device 104 (e.g., such as during consumption of the digital content item by the processor 302 of the electronic device 104).

At block 412, the content item module 206 and/or other components of the item generation engine 110 may receive an input via the keyboard 122 or other input device of the server 102 and during playback of the video via the display 124 (e.g., via the user interface 800). The input received at block 412 may indicate a particular point in time during the runtime of the video at which a haptic event should occur when the video is played via an electronic device 104 (e.g., such as during consumption of the digital content item by the processor 302 of the electronic device 104). The input received at block 412 may have a beginning, an end, and a duration (e.g., a length of time) extending from the beginning of the input to the end of the input. For example, at block 412 the user 120 may press the spacebar or any other key on the keyboard 122 at a point in time during the runtime of the video at which the user 120 would like the haptic event (e.g., activation of the vibration device 312 of the electronic device 104) to begin. At block 412 the user 120 may hold the spacebar down for a desired period of time, and may then release the spacebar. In such examples, the input provided by the user 120 at block 412 may have a beginning coinciding with the pressing of the spacebar, an end coinciding with the release of the spacebar, and a duration (e.g., a particular length of time measured and/or otherwise extending from the beginning of the input to the end of the input. In such examples, the beginning and end of the input received at block 412 may correspond to respective points in time during the runtime of the video that is playing while such an input is received.

At blocks 414 and 416, the haptic module 210 and/or other components of the item generation engine 110 may detect, track, record, measure, evaluate, and/or otherwise process the input received at block 412. For example, at block 414 the haptic module 210 may determine a length of time extending from the beginning of the video to a point in time during the runtime of the video corresponding to the beginning of the input received at block 412 (e.g., an initial input received during playback of the video via the display 124). In such examples, the haptic module 210 may comprise one or more timers configured to assist in determining such a length of time, and in such examples, a timer of the haptic module 210 may begin running when playback of the video begins at block 410. Such a timer may also stop running at the point in time during the runtime of the video corresponding to the beginning of the input received at block 412. The time recorded by such a timer operating in this way may be equal to the length of time extending from the beginning of the video to a point in time corresponding to the beginning of the input received at block 412.

Additionally, at block 416 the haptic module 210 may determine the beginning, the end, and/or the duration of each respective input received at block 412. For example, the haptic module 210 may comprise one or more timers configured to assist in determining such a duration, and in such examples, a timer of the haptic module 210 may begin running at a point in time during the runtime of the video corresponding to the beginning of the input received at block 412. Such a timer may also stop running at a point in time during the runtime of the video corresponding to the end of the input received at block 412. The time recorded by such a timer operating in this way may be equal to the duration of the input received at block 412.

At block 418, the content item module 206 and/or other components of the item generation engine 110 may sense, detect, monitor, and/or otherwise determine whether any additional inputs are received by one or more input devices of the server 102 during playback of the video. If an additional input is received at block 418 (block 418—Yes), at block 420 the haptic module 210 may determine a respective length of time extending from the end of the input received at block 412 (e.g., a previous input) to the beginning of the additional input received at block 418 (e.g., a next or subsequent input). For example, in determining such a length of time at block 420 a timer of the haptic module 210 may begin running at a point in time during the runtime of the video corresponding to the end of the input received at block 412. Such a timer may stop running at a point in time during the runtime of the video corresponding to the beginning of the input received at block 418. The time recorded by such a timer operating in this way may be equal to the length of time extending from the end of the input received at block 412 to the beginning of the additional input received at block 418. Control may then proceed to block 416.

On the other hand, if an additional input is not received at block 418 (block 418—No), at block 422 the content item module 206 and/or other components of the item generation engine 110 may sense, detect, monitor, and/or otherwise determine whether the end of the video has been reached. During playback of the video and/or upon determining that the end of the video has been reached at block 422, the haptic module 210 may generate a haptic track corresponding to the video. In any of the examples described herein, the haptic module 210 may generate the haptic track using and/or based at least in part on one or more of the durations, points in time, lengths of time, and/or other items determined at blocks 414-420. In such examples, the haptic track may comprise a collection of such items and/or information arranged in a sequential and/or chronological order. For example, such a haptic track may comprise a sequential data list including a length of time determined at block 414 followed by an input duration determined at block 416. Additionally, in examples in which more than one input (e.g., a first input and a second input) is received during the playback of the video (e.g., block 418—Yes), the sequential data list of a corresponding haptic track may additionally or alternatively include the duration of the first input followed by the duration of the second input. Such an example sequential data list may also include the length of time between the first and second inputs (determined at block 420) listed between the first duration and the second duration. Further, the haptic module 210 may store any of the determined beginnings, ends, durations, lengths of time, points in time during the runtime of the video, haptic tracks, sequential data lists, and/or other information in the data store 220. In any of the examples described herein, such information may be included in the digital content item corresponding to the video file with which the information is associated.

Figure 9:
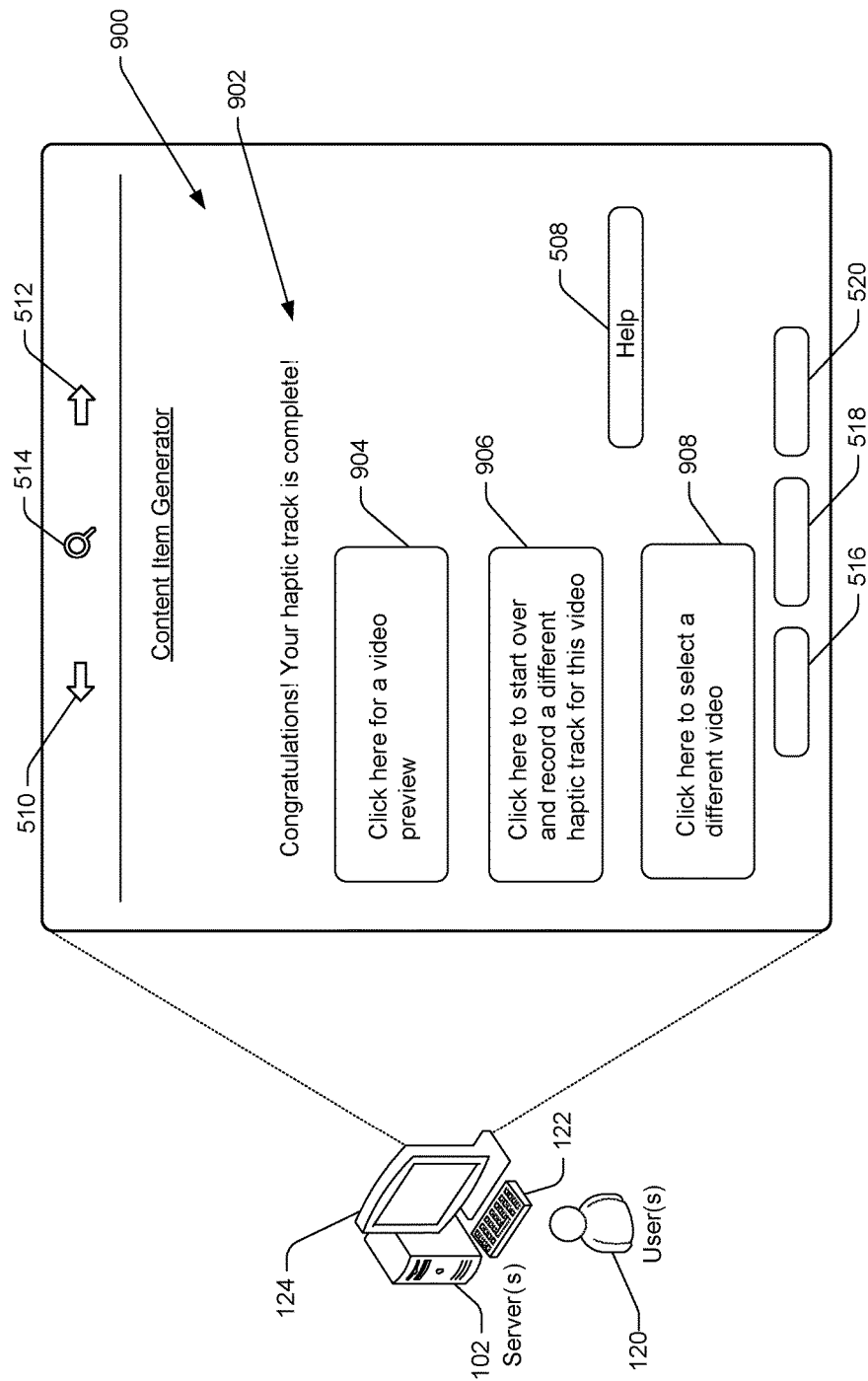
FIG. 9 illustrates still another example user interface associated with the server computer of FIG. 1. The user interface shown in FIG. 9 enables a user to request a preview of the video.

Further, upon determining that the end of the video has been reached at block 422, the content item module 206 and/or other components of the item generation engine 110 may provide the user 120 with several additional options associated with completing the digital content item generation process. For example, at block 422 the content item module 206 may provide a user interface including one or more controls configured to receive further input from the user 120 related to completion of this process. Such an example user interface 900 is illustrated in FIG. 9. As shown in FIG. 9, the user interface 900 may include text 902, a message, and/or information indicating that a haptic track has been successfully created. Such text 902 may also request, direct, and/or instruct the user 120 to select from among a list or plurality of continuation or "next step" options. For example, the user interface 900 may include one or more clickable buttons, data entry fields, and/or other physical or virtual controls 904, 906, 908 enabling the user 120 to view a preview of the video together with visual indicia and/or other indicators of the recently created haptic track, to start over and record a new/different haptic track for the video, and/or to select a different video for us in generating a digital content item.

Figure 10:
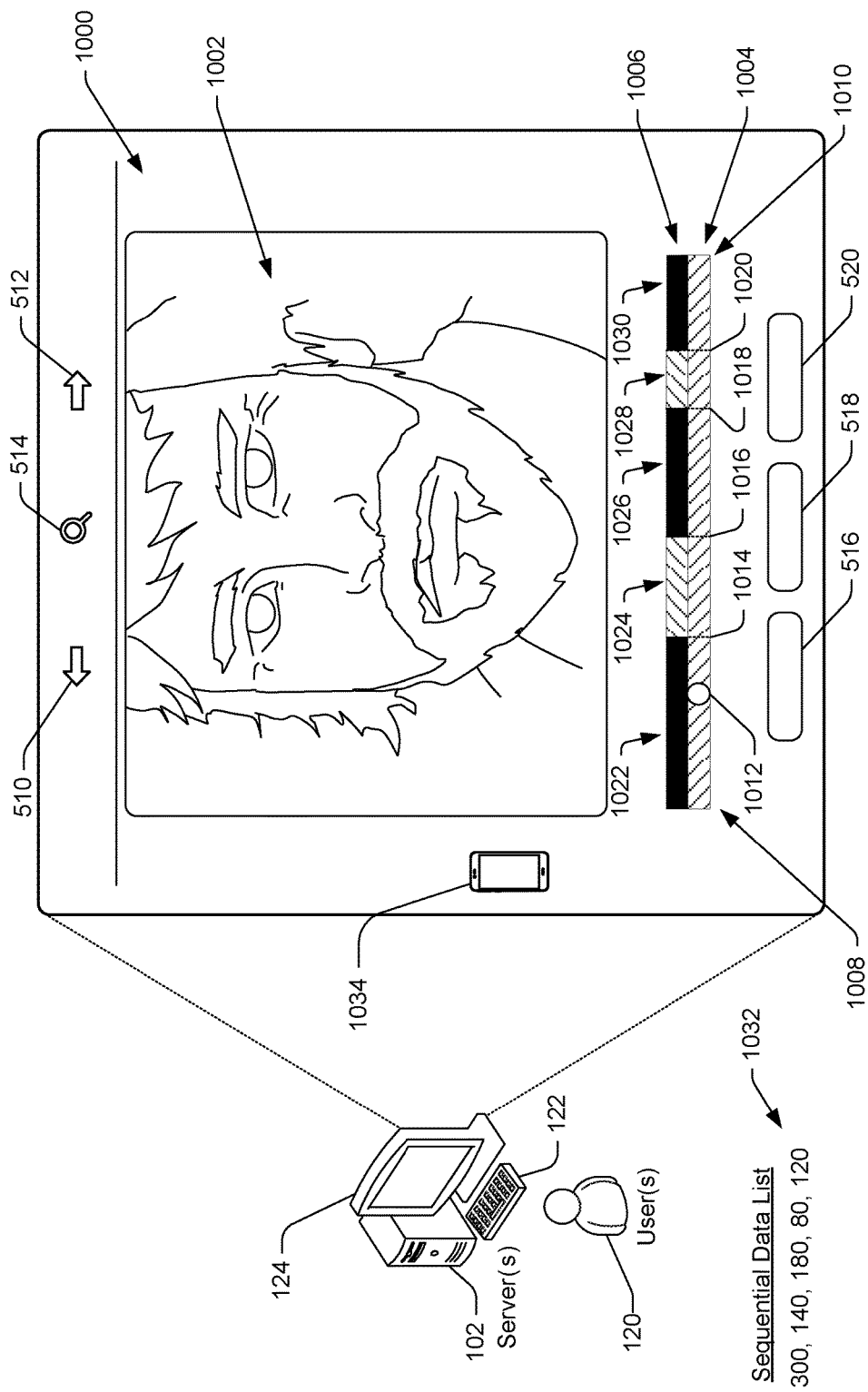
FIG. 10 illustrates a further example user interface associated with the server computer of FIG. 1. The user interface shown in FIG. 10 provides a user with a preview of the video as well as a visual representation of the haptic track.
Figure 11:
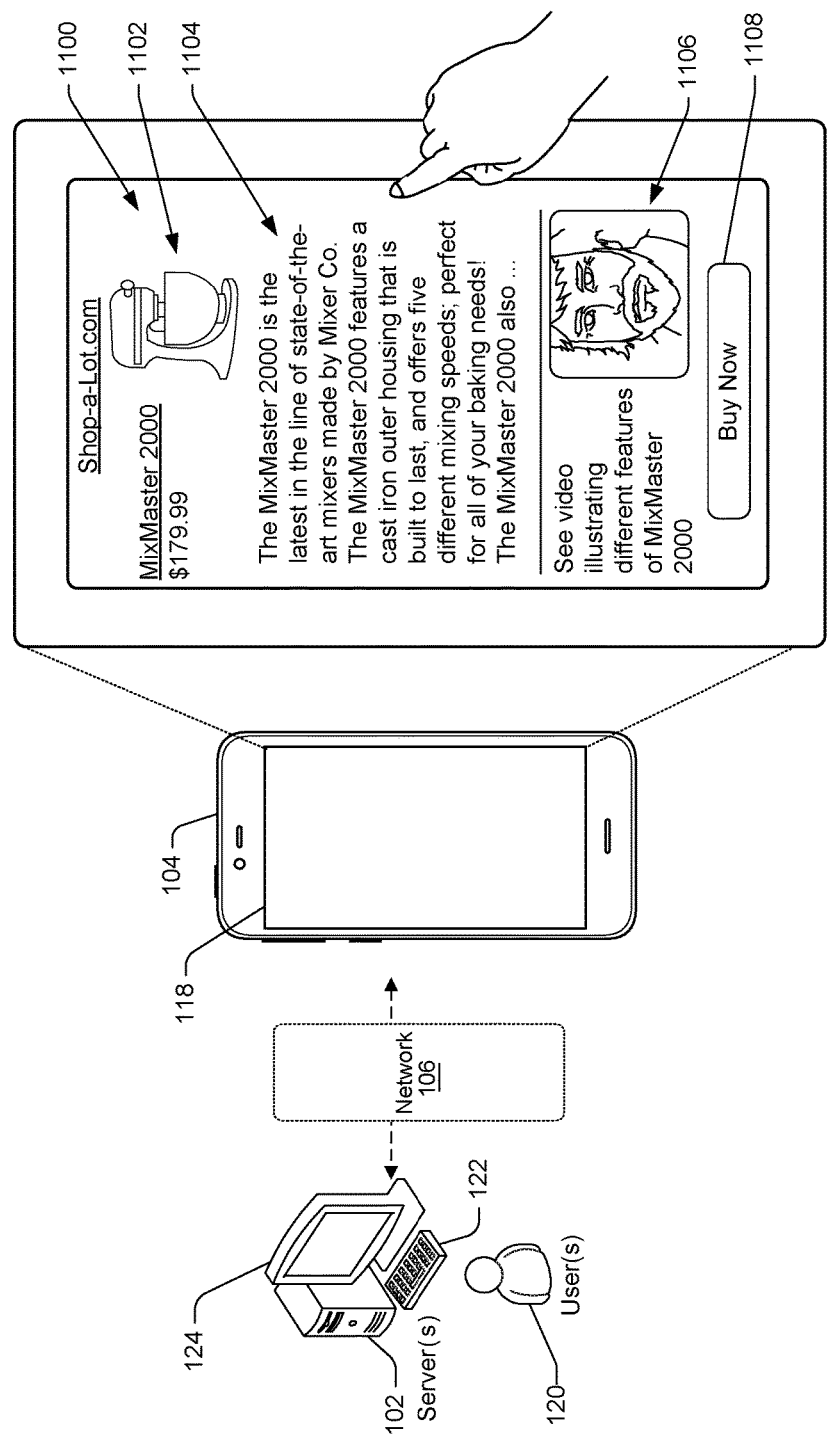
FIG. 11 illustrates an example user interface associated with the customer electronic device of FIG. 1. The user interface shown in FIG. 11 illustrates content displayed as a result of consumption of a digital content item by the electronic device.

At block 424 and, for example, at least partly in response to receiving an input via the control 904 indicative of a request by the user 120 to view a preview of the video, the content item module 206, the video module 208, and/or other components of the item generation engine 110 may display a preview of at least part of the video via the display 124. For example, at block 424 the content item module 206 and/or the video module 208 may generate and/or provide one or more user interfaces to the user 120 via the display 124, and such user interfaces may be configured to play the video corresponding to the haptic track generated at block 422. Such a user interface may also be configured to display visual indicia of the runtime of the video, the duration of various inputs received at block 412 and 418, the points in time during the runtime of the video corresponding to the beginning and end of such inputs, the lengths of time determined at blocks 414 and 420, and/or other information. In some examples, such visual indicia may be displayed on the display 124 as the preview is displayed. Such visual indicia (e.g., the points in time during the runtime of the video corresponding to the beginning and end of user inputs) may indicate particular points in time during the runtime of the video at which haptic events should occur when the video is played via an electronic device 104 (e.g., such as during consumption of the digital content item by the processor 302 of the electronic device 104). Such an example user interface 1000 is shown in FIG. 10. As illustrated in FIG. 10, an example user interface 1000 may include a window or other portion 1002 in which the video preview may be presented to the user 120.

The user interface 1000 may also include visual indicia in the form of one or more annotated or other such timelines corresponding to the runtime of the video. For example, the visual indicia may include a first timeline 1004 indicative of the runtime of the video, and a second timeline 1006 displayed simultaneously with the first timeline 1004. In some examples, the second timeline 1006 may be disposed along, adjacent, and/or proximate the first timeline 1004, and the second timeline may include blocks, portions, markers, and/or other visual indicia indicative of the various inputs received at blocks 412 and 418. The second timeline 1006 may also include blocks, portions, markers, and/or other visual indicia indicative of the lengths of time determined at blocks 414 and 420, some of which may be disposed adjacent and/or between the visual indicia indicative of the various inputs.

As shown in FIG. 10, an example first timeline 1004 may include a first end 1008 illustrative and/or otherwise indicative of a beginning of the video, a second end 1010 illustrative and/or otherwise indicative of an end of the video, and a width, length, and/or other characteristic extending from the first end 1008 to the second end 1010 illustrative and/or otherwise indicative of a runtime of the video extending from the beginning to the end. The first timeline 1004 may also include a marker 1012 that is moveable along the timeline 1004, in real time, from the first end 1008 to the second end 1010 as the preview of the video is played. The first timeline 1004 may further include one or more stationary markers 1014, 1016, 1018, 1020. Each respective stationary marker 1014, 1016, 1018, 1020 may be illustrative and/or otherwise indicative of a particular point in time during the runtime of the video. For example, the marker 1014 may be illustrative and/or otherwise indicative of a point in time corresponding to the beginning of an input (e.g., a first input) received at block 412. In such an example, the marker 1016 may be illustrative and/or otherwise indicative of a point in time corresponding to the end of such a first input. Likewise, in such an example the marker 1018 may be illustrative and/or otherwise indicative of a point in time corresponding to the beginning of an additional input (e.g., a second input) received at block 418. In such an example, the marker 1020 may be illustrative and/or otherwise indicative of a point in time corresponding to the end of such a second input.

As noted above, the second timeline 1006 may include one or more blocks, portions, markers, and/or other visual indicia indicative of the lengths of time determined at blocks 414 and 420. For example, as shown in FIG. 10 an example second timeline 1006 may include a first block 1022 illustrative and/or otherwise indicative of a length of time (e.g., a first length of time) extending from the beginning of the video to the first point in time corresponding to the beginning of the first input described above with respect to the marker 1014. Such an example first length of time may correspond to the length of time determined block 414. The second timeline 1006 may also include a second block 1024 illustrative and/or otherwise indicative of the input (e.g., a first input) received at block 412, and the block 1024 may extend from the marker 1014 to the adjacent marker 1016 to indicate the duration of the first input determined at block 416. Further, the second block 1024 may have a different color, different shading pattern, and/or other different visual appearance from the adjacent first block 1022 to assist the user 120 in distinguishing the blocks 1022, 1024. In some examples, the second timeline 1006 may also include one or more additional blocks, portions, markers, and/or other visual indicia indicative of the lengths of time determined at block 420 and/or the additional input received at block 418. For example, the second timeline 1006 shown in FIG. 10 includes an example block 1026 illustrative and/or otherwise indicative of a length of time (e.g., a second length of time) extending from a point in time corresponding to the end of the first input described above with respect to the marker 1014 to the beginning of the second input described above with respect to marker 1018. The example second timeline 1006 also includes a block 1028 illustrative and/or otherwise indicative of a duration of the second input described above with respect to markers 1018 and 1020. The example second timeline 1006 further includes a block 1030 illustrative and/or otherwise indicative of a length of time (e.g., a third length of time) extending from a point in time corresponding to the end of the second input described above with respect to the marker 1020 to the end of the video.

Further, in such examples one or more of the controls 516, 518, 520 may be operable to accept input from the user 120 indicative of a requested modification to the durations, points in time, length of time, and/or other information represented by the first and second timelines 1004, 1006. For example, one or more of the controls 516, 518, 520 may be configured to receive an input from the user 120 during display of the preview, and such a control 516, 518, 520 may be configured to modify at least one of the durations associated with and/or otherwise illustrated by the respective blocks 1024, 1028 and/or by the markers 1014, 1016, 1018, 1020. One or more of the controls 516, 518, 520 may also be configured to modify at least one of the lengths of time associated with and/or otherwise illustrated by the respective blocks 1022, 1026, 1030 and/or by the markers 1014, 1016, 1018, 1020. In still further examples, one or more of the timelines 1004, 1006 may be configured to receive a drag input or other like input using a mouse or other input device of the server 102. In such examples, the user 120 may be able to modify one or more of the durations, lengths of time, beginnings, ends, points in time, and/or other information illustrated on the timelines 1004, 1006 by dragging and/or directly moving one or more of the markers 1014, 1016, 1018, 1020 using a mouse or other input device of the server 102.

FIG. 10 also illustrates an example sequential data list 1032 corresponding to the second timeline 1006 shown in the user interface 1000. For example the sequential data list 1032 of FIG. 10 indicates that the first length of time illustrated by block 1022 is 300 ms, the first duration illustrated by block 1024 is 140 ms, the second length of time illustrated by block 1026 is 180 ms, the second duration illustrated by block 1028 is 80 ms, and the third length of time illustrated by block 1030 is 120 ms. In such an example, consumption of the digital content item including the sequential data list 1032 by the processor 302 of an electronic device 104 may cause the electronic device 104 to, during playback of the video on the electronic device 104 and in immediate succession, maintain the vibration device 312 deactivated at the beginning of the video for 300 ms, maintain activation of the vibration device 312 for 140 ms, maintain the vibration device 312 deactivated for 180 ms, maintain activation of the vibration device 312 for 80 ms, and maintain the vibration device 312 deactivated for 120 ms.

Further, as shown in FIG. 10, in some examples the user interface 1000 may include one or more icons 1034 or other visual indicia indicating when haptic feedback will be provided during playback of the video on the electronic device 104. For example, it is understood that the preview may be viewed on a device (e.g., the display 124 associated with the server computer 102) that may not be capable of providing haptic feedback during playback of the preview. Accordingly, in order to indicate to the user 120 the points in time and the durations during which haptic feedback will be provided, the use interface 1000 may include such icons. In example embodiments, the icons 1034 may comprise an image of a vibrating electronic device 104, a colored light, a blinking image, and/or any other visual, audible, or other indicia.

Additionally, in any of the examples described herein, one or more of the controls 516, 518, 520 may be configured to modify an intensity level of the vibration device 312 as the video is played by the electronic device 104. For example, while previewing the video via the user interface 1000 the user 102 may provide an input via one or more of the controls 516, 518, 520 indicating a desired increase or decrease of the intensity level of the vibration device 312 during at least a portion of the video. In such examples, consumption of the digital content item including the sequential data list 1032 by the processor 302 of an electronic device 104 may cause the electronic device 104 to, during playback of the video on the electronic device 104, maintain operation of the vibration device 312 at a first intensity level during at least part of, for example, the first duration represented by block 1022. Such a modification to the intensity level during the first duration may also cause the electronic device 104 to operate the vibration device 312, for at least part of the first duration represented by block 1022, at a second intensity level different from the first intensity level. In any of the examples described herein, such controls may additionally or alternatively comprise one or more buttons, keys, touchpads, or other components of a physical or virtual keyboard 122, mouse, stylus, or other such I/O device associated with the server computer 102.

Figure 4B:
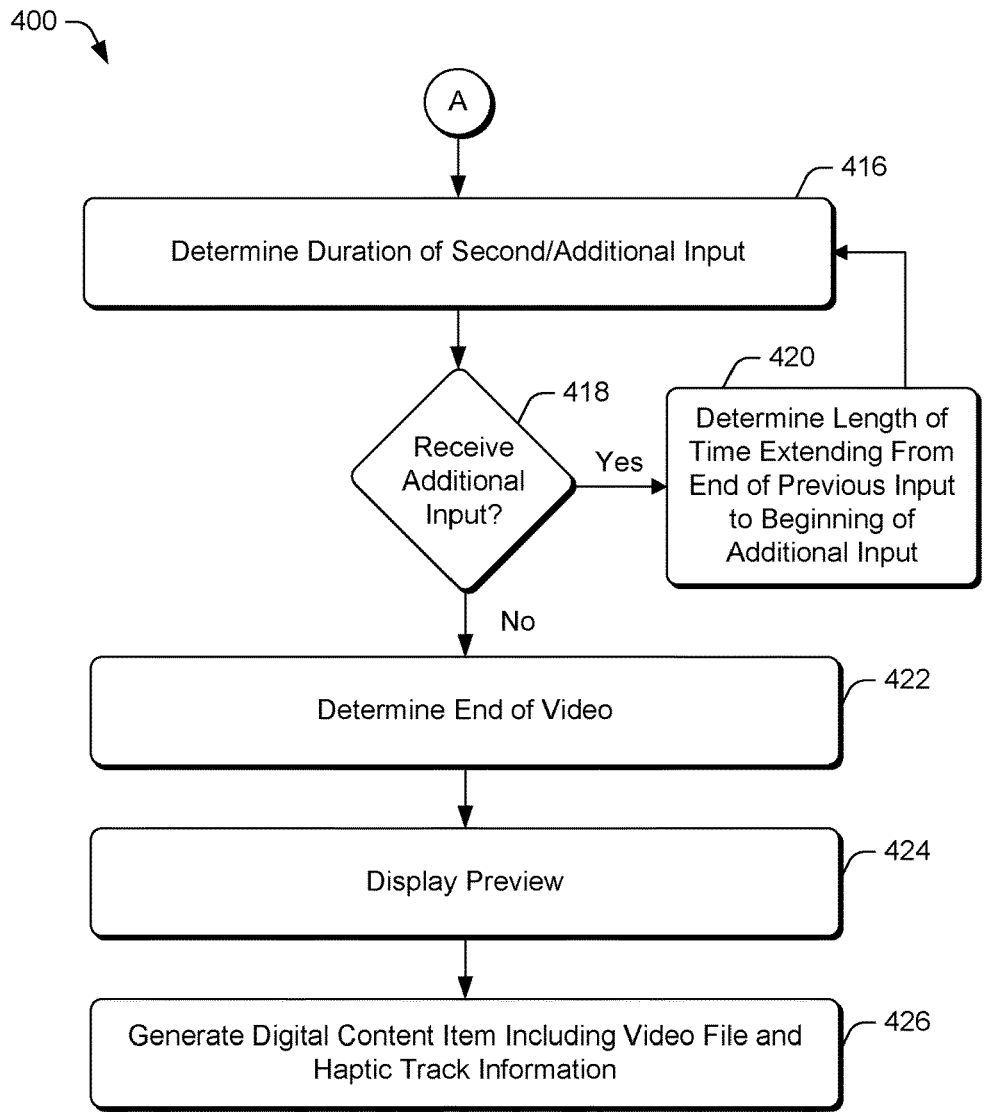

With continued reference to FIG. 4B, at block 426 the content item module 206 and/or other components of the item generation engine 110 may generate a digital content item comprising at least the video file corresponding to the video illustrated in the preview associated with the user interface 1000. Such an example digital content item may also include any of the haptic track information described herein, and such information may include the sequential data list 1032 and/or other information or components included in the haptic track described above. Further, such an example digital content item may also include at least one of a digital image of an object shown in the video, and text associated with such an object. In such examples, consumption of the digital content item by the processor of 302 of the electronic device 104 may cause the electronic device to display at least one of the image, the text, and/or the video. For instance, upon receiving a request 112 from the electronic device 104, the server 102 may provide the electronic device 104 with access to the digital content item generated at block 426. As shown by the example user interface 1100 illustrated in FIG. 11, the electronic device 104 may access the digital content item via the network 106. The user interface module 306 and/or other components of the item consumption engine 108 may then present the user interface 1100 via the display 118 such that the user 116 may view and/or otherwise consume various components of the digital content item. For example, the user interface 1100 may display an image 1102 of the object that is the subject of the video described above with respect to FIG. 10. The user interface 1100 may also display text 1104 describing and/or otherwise corresponding to the object shown in the image 1102. The user interface 1100 may further include a thumbnail or other control 1106 configured to receive an input from the user 116. For example, upon selecting the control 1106 the electronic device 104 may be configured to play the video via the display 118 and may be configured to control activation and deactivation of the vibration device 312 according to the sequential data list 1032 and/or other information or components included in the haptic track. The user interface 1100 may also include one or more controls 1108 configured to receive an input from the user 116 indicative of a command to purchase the object and/or to provide additional information about the object.

Accordingly, the example systems and methods of the present disclosure offer unique and heretofore unworkable approaches to generating digital content items associated with objects being offered for sale. Such systems and methods simplify the process of generating such digital content items, and decrease the time and effort required to generate such digital content items. In particular, the example systems and methods described herein enable users to indicate the precise time and duration in which haptic feedback should be provided during the playback of videos related to such objects by receiving input from such users, in real time, while the users actually view the video. As a result, the time-consuming and tedious process of manually entering the start time, duration, and intensity of such haptic events can be avoided, system efficiency is increased, and user satisfaction is greatly improved.

Although the techniques have been described in language specific to structural features and/or methodological acts, it is to be understood that the appended claims are not necessarily limited to the features or acts described. Rather, the features and acts are described as example implementations of such techniques.

Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. A method, comprising:
presenting a video associated with a video file via a display, the video having a beginning, an end, and a runtime extending from the beginning of the video to the end of the video;
receiving a first input from the user, the first input being provided via the input device during playback of the video,
the first input having a beginning, an end, and a first duration extending from the beginning of the first input to the end of the first input;
determining the first duration of the first input;
determining a first length of time extending from the beginning of the video to a first point in time during the runtime of the video, the first point in time corresponding to the beginning of the first input; and
generating a digital content item comprising at least the video file and a sequential data list, the sequential data list including the first length of time followed by the first duration, wherein consumption of the digital content item by a processor of an electronic device causes the electronic device to:
play the video corresponding to the video file, and
during playback of the video on the electronic device, activate a vibration device of the electronic device at the first point in time during the runtime of the video, and
maintain activation of the vibration device for the first duration.

2. The method of claim 1, wherein the digital content item further comprises:
a digital image file associated with an object, and
text associated with the object, wherein
the object is shown in the video, and
consumption of the digital content item by the processor causes the electronic device to display an image of the object and the text.

3. The method of claim 1, further comprising:
displaying a sequential countdown via the display; and
beginning playback of the video via the display after the countdown has ended.

4. The method of claim 1, further comprising:
receiving a second input from the user provided via the input device and during playback of the video,
the second input having a beginning, an end, and a second duration extending from the beginning of the second input to the end of the second input; and
determining the second duration of the second input, wherein the sequential data list includes the first duration followed by the second duration.

5. The method of claim 4, further comprising:
determining a second length of time extending from the end of the first input to the beginning of the second input, wherein
the sequential data list includes the second length of time between the first duration and the second duration,
the end of the first input corresponding to a second point in time during the runtime of the video, and
consumption of the digital content item by the processor causes electronic device to maintain the vibration device deactivated, at the second point in time, for the second length of time during playback of the video on the electronic device.

6. A system, comprising:
one or more computers having a display, an input device, a processor, and memory operably coupled to the processor, the memory storing instructions which, when executed by the processor, cause the processor to perform one or more operations including:
causing playback of a video via the display;
receiving a first input via the input device during playback of the video, the first input having a beginning, an end, and a first duration extending from the beginning of the first input to the end of the first input;

receiving a second input via the input device during playback of the video,
the second input being separate from the first input, and having a beginning, an end, and a second duration extending from the beginning of the second input to the end of the second input;

determining a length of time extending from the end of the first input to the beginning of the second input; and generating a digital content item comprising a sequential data list, the sequential data list including the first duration followed by the second duration, and the length of time listed between the first duration and the second duration, wherein consumption of the digital content item by a processor of an electronic device causes the electronic device to:
play the video corresponding to the video file, and during playback of the video on the electronic device,
activate a vibration device of the electronic device at a first point in time during a runtime of the video, the first point in time corresponding to the beginning of the first input,
maintain activation of the vibration device for the first duration or until playback of the video on the electronic device is stopped,
deactivate the vibration device at a second point in time during the runtime of the video, the second point in time corresponding to the end of the first input, and
maintain the vibration device deactivated for the first length of time.

7. The system of claim 6, wherein consumption of the digital content item by the processor of the electronic device causes the electronic device to:
activate the vibration device at a third point in time during the runtime of the video, the third point in time corresponding to the beginning of the second input, and
maintain activation of the vibration device for the second duration or until playback of the video on the electronic device is stopped.

8. The system of claim 6, the operations further comprising:
receiving, via a network, a request from the electronic device associated with the video; and
providing the electronic device with access to the digital content item via the network at least partly in response to the request.

9. The system of claim 6, the operations further comprising:
requesting, via the display, selection of an operating mode, the operating mode governing a manner in which at least one of the first input or the second input is provided via the input device; and
receiving a third input via the input device, the third input indicating selection of the operating mode.

10. The system of claim 6, the operations further comprising displaying, via the display, instructions associated with providing the first input.

11. The system of claim 6, the operations further comprising:
displaying a sequential countdown via the display; and
beginning playback of the video via the display after the countdown has ended.

12. The system of claim 6, wherein the digital content item further comprises:
a digital image file associated with an object, and
text associated with the object, wherein
the object is shown in the video, and
consumption of the digital content item by the processor of the electronic device causes the electronic device to display an image of the object and the text.

13. The system of claim 6, wherein playback of the video via the display is at a first playback rate, the operations further including:
receiving a third input via a control configured to modify a rate at which the video is played via the display; and
causing playback of at least part of the video, via the display, at a second playback rate less than the first playback rate at least partly in response to the third input.

14. The system of claim 6, wherein operation of the vibration device is maintained for the first duration at a first intensity level, the operations further comprising:
receiving a third input via a control configured to modify an intensity level of the vibration device, wherein consumption of the digital content item by the processor of the electronic device causes the electronic device to:
operate the vibration device, for at least part of the first duration, at a second intensity level different from the first intensity level at least partly in response to the third input.

15. The system of claim 6, the operations further comprising:
displaying a preview of at least part of the video via the display; and
receiving a third input via a control and during display of the preview, the control configured to modify at least one of the first duration, the second duration, or the first length of time, wherein consumption of the digital content item by the processor of the electronic device causes the electronic device to:
operate the vibration device based at least in part on the third input.

16. The system of claim 6, the operations further comprising:
determining an additional length of time extending from a beginning of the video to the first point in time; and
including the additional length of time in the sequential data list such that the additional length of time is listed before the first duration, wherein consumption of the digital content item by the processor of the electronic device causes the electronic device to:
maintain the vibration device deactivated at the beginning of the video for the additional length of time.

17. A method, comprising:
causing playback of a video via a display;
receiving a first input via an input device during playback of the video,
the first input having a beginning, an end, and a first duration extending from the beginning of the first input to the end of the first input;
receiving a second input via the input device during playback of the video,
the second input being separate from the first input, and having a beginning, an end, and a second duration extending from the beginning of the second input to the end of the second input;
determining a length of time extending from the end of the first input to the beginning of the second input; and generating a digital content item comprising at least a video file corresponding to the video, and a sequential data list, the sequential data list including the first duration followed by the second duration, and the length of time listed between the first duration and the second duration, wherein consumption of the digital content item by a processor of an electronic device causes the electronic device to:
play the video corresponding to the video file, and
during playback of the video on the electronic device,
  activate a vibration device of the electronic device at a first point in time during a runtime of the video, the first point in time corresponding to the beginning of the first input,
  maintain activation of the vibration device for the first duration or until playback of the video on the electronic device is stopped,
  deactivate the vibration device at a second point in time during the runtime of the video, the second point in time corresponding to the end of the first input, and
  maintain the vibration device deactivated for the first length of time.

18. The method of claim 17, wherein consumption of the digital content item by the processor of the electronic device causes the electronic device to:
activate the vibration device of the electronic device at a second point in time during the runtime of the video, the second point in time corresponding to the beginning of the second input, and
maintain activation of the vibration device for the second duration or until playback of the video on the electronic device is stopped.

19. The method of claim 17, further comprising:
displaying a sequential countdown via the display; and
beginning playback of the video via the display after the countdown has ended.

20. The method of claim 17, wherein the digital content item further comprises:
a digital image file associated with an object, and
text associated with the object, wherein
  the object is shown in the video, and
  consumption of the digital content item by the processor of the electronic device causes the electronic device to display an image of the object and the text.

* * * * *